United States Patent
Edge et al.

(10) Patent No.: US 11,388,657 B2
(45) Date of Patent: Jul. 12, 2022

(54) METHODS AND SYSTEMS FOR SUPPORTING UNIFIED LOCATION OF A MOBILE DEVICE IN A 5G NETWORK

(71) Applicant: QUALCOMM Incorporated, San Diego, CA (US)

(72) Inventors: Stephen William Edge, Escondido, CA (US); Haris Zisimopoulos, London (GB); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/537,552

(22) Filed: Aug. 10, 2019

(65) Prior Publication Data

US 2020/0053638 A1    Feb. 13, 2020

Related U.S. Application Data

(60) Provisional application No. 62/807,222, filed on Feb. 18, 2019, provisional application No. 62/718,366, filed on Aug. 13, 2018.

(51) Int. Cl.
  *H04W 48/16*  (2009.01)
  *H04W 8/12*   (2009.01)
  (Continued)

(52) U.S. Cl.
  CPC .......... *H04W 48/16* (2013.01); *H04W 4/029* (2018.02); *H04W 8/12* (2013.01); *H04W 24/10* (2013.01);
  (Continued)

(58) Field of Classification Search
  CPC ..... H04W 4/02; H04W 92/12; H04W 64/003; H04W 8/04; H04W 8/10; H04W 8/12
  See application file for complete search history.

(56) References Cited

U.S. PATENT DOCUMENTS 6,225,944 B1   5/2001   Hayes
8,477,811 B2   7/2013   Kitazoe
(Continued)

FOREIGN PATENT DOCUMENTS

EP    1109334 A2    6/2001
WO    WO-2009097602 A1    8/2009
(Continued)

OTHER PUBLICATIONS

"3rd Generation Partnership Project; Technical Specification Group Services and System Aspects; Functional stage 2 description of Location Services (LCS) (Release 15)", 3GPP Standard; Technical Specification; 3GPP TS 23.271, 3rd Generation Partnership Project (3GPP), Mobile Competence Centre ; 650, Route Des Lucioles ; F-06921 Sophia-Antipolis Cedex ; France, vol. SA WG2, No. V15.0.0, Jun. 19, 2018 (Jun. 19, 2018) , pp. 1-184, XP051472853, [retrieved on Jun. 19, 2018], paragraph [9.1.12.1]—paragraph [9.1.12.4].

(Continued)

*Primary Examiner* — Ayaz R Sheikh
*Assistant Examiner* — Debebe A Asefa
(74) *Attorney, Agent, or Firm* — Paradice and Li LLP

(57) ABSTRACT

Location services for a user equipment (UE) are supported with a Network Exposure Function (NEF) serving as a focal point for any location request. An entity that needs the location of the UE sends a location request to the NEF in the home PLMN or Visited PLMN for the UE. The location request includes, e.g., a type of location request, a required location accuracy, a required response time or some combination of these. The NEF determines whether to use a Gateway Mobile Location Center (GMLC) or a serving Access and Mobility Management Function (AMF) for the UE to obtain the UE location based on the content of the location request and sends the location request to the GMLC (Continued)

or serving AMF accordingly. Additionally, if the serving AMF is used, a serving base station may obtain the UE location and send the UE location to the serving AMF.

52 Claims, 16 Drawing Sheets

(51) Int. Cl.
*H04W 64/00* (2009.01)
*H04W 4/029* (2018.01)
*H04W 24/10* (2009.01)
*H04W 84/04* (2009.01)

(52) U.S. Cl.
CPC ........ *H04W 64/003* (2013.01); *H04W 84/042* (2013.01)

(56) References Cited

U.S. PATENT DOCUMENTS

| | | | |
|---|---|---|---|
| 8,588,870 | B1 | 11/2013 | Vargantwar |
| 9,998,856 | B2 | 6/2018 | Edge |
| 10,506,543 | B1 | 12/2019 | Edge et al. |
| 2006/0099961 | A1 | 5/2006 | Duan |
| 2006/0293066 | A1 | 12/2006 | Edge et al. |
| 2008/0200182 | A1 | 8/2008 | Shim |
| 2012/0149325 | A1 | 6/2012 | Titus et al. |
| 2014/0192737 | A1 | 7/2014 | Belghoul et al. |
| 2018/0020423 | A1 | 1/2018 | Wang et al. |
| 2018/0054795 | A1 | 2/2018 | Edge |
| 2019/0116483 | A1 | 4/2019 | Ryu et al. |
| 2019/0357129 | A1* | 11/2019 | Park .................... H04W 60/00 |
| 2020/0045666 | A1 | 2/2020 | Edge et al. |
| 2020/0053638 | A1* | 2/2020 | Edge .................... H04W 64/003 |
| 2020/0053686 | A1 | 2/2020 | Edge et al. |
| 2020/0092776 | A1 | 3/2020 | Edge |
| 2020/0236644 | A1* | 7/2020 | Gunnarsson .......... G01S 5/0236 |
| 2020/0367022 | A1 | 11/2020 | Tenny et al. |
| 2022/0022115 | A1 | 1/2022 | Edge |

FOREIGN PATENT DOCUMENTS

| | | |
|---|---|---|
| WO | WO-2010071518 A1 | 6/2010 |
| WO | WO-2011142715 A1 | 11/2011 |
| WO | WO-2017078485 A1 | 5/2017 |
| WO | 2017196510 A1 | 11/2017 |
| WO | 2018085017 A1 | 5/2018 |
| WO | 2018129337 A1 | 7/2018 |

OTHER PUBLICATIONS

Huawei et al., "Introduction of early data transmission", 3GPP Draft; 36413_CR1578R4_(REL-15)_R3-183469, 3rd Generation Partnership Project (3GPP), Mobile Competence Centre ; 650, Route Des Lucioles ; F-06921 Sophia-Antipolis Cedex ; France, vol. RAN WG3, No. Busan, Korea; May 21, 2018-May. 25, 2018, Jun. 7, 2018 (Jun. 7, 2018), XP051511815, 16 Pages, Retrieved from the Internet: URL:http://www.3gpp.org/ftp/tsg%5Fran/TSG%5FRAN/TSGR%5F80/Docs/RP%2D181242%2Ezip [retrieved on Jun. 7, 2018], p. 1-p. 4.

Qualcomm Incorporated: "Location Reporting Using Control Plane CIOT EPS Optimisation", 3GPP Draft, 23271 CR0424R2 CIOT EXT (REL-14), S2-170513 (CR 23.271—Location Reporting Using CP)-R6, 3rd Generation Partnership Project (3GPP), Mobile Competence Centre, 650, Route Des Lu, F-0, vol. RAN SA WG2, No. Spokane, WA, USA, Jan. 16, 2017-Jan. 20, 2017, Mar. 4, 2017 (Mar. 4, 2017), XP051234963, 15 pages, Retrieved from the Internet: URL: http://www.3gpp.org/ftp/Meetings_3GPP_SYNC/SA/Docs/. [retrieved on Mar. 4, 2017] pp. 7-14 figures 9.1.19.1-1.

Qualcomm Incorporated: "Low Power Periodic and Triggered Location for the LMF Based Solution", 3GPP Draft, S2-183966, WAS 3623 (P-CR For TR 23.731 For Low Power Triggered Location for the LMF Based Solution), 3rd Generation Partnership Project (3GPP), Mobile Competence Centre, 650, Route Des Lu, SA, F-0, vol. RAN WG2, No. Sanya, China, Apr. 16, 2018-Apr. 20, 2018, Apr. 18, 2018 (Apr. 18, 2018), XP051432437, 12 pages, Retrieved from the Internet: URL: http://www.3gpp.org/ftp/Meetings%5F3GPP%5FSYNC/SA2/%5FUpdate02/. [retrieved on Apr. 18, 2018] figures 1,6.2.3.5-1 pp. 1-5.

3GPP TS 23.271, "3rd Generation Partnership Project; Technical Specification Group Services and System Aspects; Functional Stage 2 Description of LCS (Release 4)", 3GPP TS 23.271, V4.0.0, Jan. 2001, pp. 1-58, 3GPP Tsg_sa\WG2_Arch, Feb. 23, 2001.

Huawei, "Introduction of EDT for eMTC and NB-Iol Enhancements in TS 36.300", R2-1807880, 3GPP TSG-RAN2 Meeting #102, Busan, Korea, May 21-May 25, 2018, 12 Pages.

LG Electronics Inc., "Indication of EDT support", R2-1713758, 3GPP TSG-RAN WG2 Meeting #100, (R2-171xxxx), Reno, USA, Nov. 27-Dec. 1, 2017, 2 Pages.

Qualcomm Incorporated: "Core Network impacts from EDT", S2-178485, SA WG2 Meeting #124, Nov. 27-Dec. 1, 2017, Reno, NV, USA, 5 Pages.

International Search Report and Written Opinion—PCT/US2019/046109—ISA/EPO—dated Oct. 17, 2019.

* cited by examiner

METHODS AND SYSTEMS FOR SUPPORTING UNIFIED LOCATION OF A MOBILE DEVICE IN A 5G NETWORK

CROSS-REFERENCE TO RELATED APPLICATIONS

This application claims the benefit of U.S. Provisional Application No. 62/718,366, entitled "METHODS AND SYSTEMS FOR SUPPORTING 5G UNIFIED LOCATION," filed Aug. 13, 2018, and U.S. Provisional Application No. 62/807,222, entitled "SYSTEMS AND METHODS FOR DEFERRED 5G LOCATION OF A MOBILE DEVICE USING A COMBINED AMF AND LMF BASED SOLUTION," filed Feb. 18, 2019, both of which are assigned to the assignee hereof and which are expressly incorporated herein by reference in their entireties.

BACKGROUND

Field

The present disclosure relates generally to wireless communication, and more specifically to techniques for supporting location services for user equipments (UEs).

Relevant Background

Location of a UE with Fifth Generation (5G) network access can be enabled in several ways. With one method (referred to as a "Gateway Mobile Location Center (GMLC) location" method or as a "GMLC based location" method), a control plane (CP) location solution can be used in which an external client or network function (NF) sends a location request for a target UE to a GMLC. The GMLC then sends the location request to a serving Access and Mobility Management Function (AMF) for the target UE, which forwards the location request to a Location Management Function (LMF). The LMF can then employ UE positioning methods using a Long Term Evolution (LTE) Positioning Protocol (LPP) and/or network based position methods using a New Radio (NR) Positioning Protocol A (NRPPa) to obtain the UE location, which is returned to the external client or NF via the AMF and GMLC. In a variant of the GMLC location method, the GMLC could bypass the AMF and send the location request directly to the LMF with the LMF later returning the obtained location back to the GMLC.

However, a 5G network may employ other methods to support the location of a target which do not use a GMLC. For example, in one alternative method, a location request for a target UE may be sent by an external client or external Application Function (AF) to a Network Exposure Function (NEF) instead of to a GMLC, with the NEF sending the location request to a serving AMF for the target UE, which later returns the location of the UE to the NEF.

The existence of several methods of obtaining the location of a target UE may be detrimental to both an external client or AF and a network, since an external client or AF may need to support access to both a GMLC and another network entity like an NEF and a network may need to support two or more location methods. In addition, one method may have inferior performance (e.g. higher latency and/or lower accuracy) than another method, but an external client or AF may not be aware of this and may accidentally select a method with inferior performance.

Methods of avoiding these drawbacks may therefore be useful.

SUMMARY

Methods and techniques are described for supporting location services for a user equipment (UE) with a Network Exposure Function (NEF) serving as a focal point for any location request. An entity that needs the location of the UE sends a location request to the NEF in the home PLMN or Visited PLMN for the UE. The location request includes, e.g., a type of location request, a required location accuracy, a required response time or some combination of these. The NEF determines whether to use a Gateway Mobile Location Center (GMLC) or a serving Access and Mobility Management Function (AMF) for the UE to obtain the UE location based on the content of the location request and sends the location request to the GMLC or serving AMF accordingly. Additionally, if the serving AMF is used, a serving base station may obtain the UE location and send the UE location to the serving AMF.

In one implementation, a method for supporting location services for a user equipment (UE) performed by a Network Exposure Function (NEF) includes receiving by the NEF a location request for the UE from an other entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these; determining whether to use a Gateway Mobile Location Center (GMLC) or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the determining the GMLC or the serving AMF is based on at least one of the type of location request, the required location accuracy, the required location response time and whether the PLMN supports location of UEs using a GMLC or a serving AMF; sending the location request to the determined GMLC or the determined serving AMF; receiving the UE location or a confirmation of acceptance of the location request from the determined GMLC or the determined serving AMF; and sending the UE location or the confirmation of the acceptance of the location request to the other entity.

In one implementation, a Network Exposure Function (NEF) for supporting location services for a user equipment (UE) includes an external interface for receiving and sending messages to entities in a network; memory configured to store instructions; and at least one processor coupled to the external interface and the memory, the at least one processor configured by the instructions stored in memory to: receive via the external interface a location request for the UE from an other entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these; determine whether to use a Gateway Mobile Location Center (GMLC) or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the determining the GMLC or the serving AMF is based on at least one of the type of location request, the required location accuracy, the required location response time and whether the PLMN supports location of UEs using a GMLC or a serving AMF; send via the external interface the location request to the determined GMLC or the determined serving AMF; receive via the external interface the UE location or a confirmation of acceptance of the location request from the determined GMLC or the determined serving AMF; and send via the external interface the UE location or the confirmation of the acceptance of the location request to the other entity.

In one implementation, a Network Exposure Function (NEF) for supporting location services for a user equipment (UE) includes means for receiving by the NEF a location request for the UE from an other entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these; means for determining whether to use a Gateway Mobile Location Center (GMLC) or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the determining the GMLC or the serving AMF is based on at least one of the type of location request, the required location accuracy, the required location response time and whether the PLMN supports location of UEs using a GMLC or a serving AMF; means for sending the location request to the determined GMLC or the determined serving AMF; means for receiving the UE location or a confirmation of acceptance of the location request from the determined GMLC or the determined serving AMF; and means for sending the UE location or the confirmation of the acceptance of the location request to the other entity.

In one implementation, a non-transitory computer readable medium comprising instructions, which when executed by a processor of a Network Exposure Function (NEF) for supporting location services for a user equipment (UE) cause the processor to: receive by the NEF a location request for the UE from an other entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these; determine whether to use a Gateway Mobile Location Center (GMLC) or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the determining the GMLC or the serving AMF is based on at least one of the type of location request, the required location accuracy, the required location response time and whether the PLMN supports location of UEs using a GMLC or a serving AMF; send the location request to the determined GMLC or the determined serving AMF; receive the UE location or a confirmation of acceptance of the location request from the determined GMLC or the determined serving AMF; and send the UE location or the confirmation of the acceptance of the location request to the other entity.

In one implementation, a method for supporting location services for a user equipment (UE) performed by a Gateway Mobile Location Center (GMLC) includes receiving from a Network Exposure Function (NEF) a location request for a UE, wherein the NEF received the location request from another entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either the GMLC or a serving Access and Mobility Management Function (AMF) for the UE to obtain a UE location, wherein the GMLC employs a location server to obtain the UE location, wherein the serving AMF obtains the UE location from a serving Radio Access Network (RAN) for the UE, wherein the NEF determined the GMLC based on at least one of the type of location request, the required location accuracy, the required location response time and whether the PLMN supports location of UEs using a GMLC or a serving AMF; sending the location request to the location server; receiving the UE location or a confirmation of the location request from the location server; and sending the UE location or the confirmation of the location request to the NEF.

In one implementation, a Gateway Mobile Location Center (GMLC) for supporting location services for a user equipment (UE) includes an external interface for receiving and sending messages to entities in a network; memory configured to store instructions; and at least one processor coupled to the external interface and the memory, the at least one processor configured by the instructions stored in memory to: receive via the external interface from a Network Exposure Function (NEF) a location request for a UE, wherein the NEF received the location request from another entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either the GMLC or a serving Access and Mobility Management Function (AMF) for the UE to obtain a UE location, wherein the GMLC employs a location server to obtain the UE location, wherein the serving AMF obtains the UE location from a serving Radio Access Network (RAN) for the UE, wherein the NEF determined the GMLC based on at least one of the type of location request, the required location accuracy, the required location response time and whether the PLMN supports location of UEs using a GMLC or a serving AMF; send via the external interface the location request to the location server; receive via the external interface the UE location or a confirmation of the location request from the location server; and send via the external interface the UE location or the confirmation of the location request to the NEF.

In one implementation, a Gateway Mobile Location Center (GMLC) for supporting location services for a user equipment (UE), includes means for receiving from a Network Exposure Function (NEF) a location request for the UE, wherein the NEF received the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines the GMLC or a serving Access and Mobility Management Function (AMF) for the UE to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; means for sending the location request to the location server; means for receiving the UE location or a confirmation of the location request from the location server; and means for sending the UE location or the confirmation of the location request to the NEF.

In one implementation, a non-transitory computer readable medium comprising instructions, which when executed by a processor of a Gateway Mobile Location Center (GMLC) for supporting location services for a user equipment (UE) cause the processor to: receive from a Network Exposure Function (NEF) a location request for the UE, wherein the NEF received the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either the GMLC or a serving Access and Mobility Management Function (AMF) for the UE to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; send the location request to the location server; receive the UE location or a confirmation of the location request from the location server; and send the UE location or the confirmation of the location request to the NEF.

In one implementation, a method for supporting location services for a user equipment (UE) performed by a serving Access and Mobility Management Function (AMF) for the UE, includes receiving from a Network Exposure Function (NEF) a location request for a UE, wherein the NEF received the location request from another entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either a Gateway Mobile Location Center (GMLC) or the serving AMF for the UE to obtain a UE location, wherein the GMLC employs a location server to obtain the UE location, wherein the serving AMF obtains the UE location from a serving Radio Access Network (RAN) for the UE, wherein the NEF determined the serving AMF based on at least one of the type of location request, the required location accuracy, the required location response time and whether the PLMN supports location of UEs using a GMLC or a serving AMF; sending the location request to the serving RAN for the UE; receiving the UE location or a confirmation of the location request from the serving RAN; and sending the UE location or the confirmation of the location request to the NEF.

In one implementation, a serving Access and Mobility Management Function (AMF) for a user equipment (UE) for supporting location services for the UE, the serving AMF includes an external interface for receiving and sending messages to entities in a network; memory configured to store instructions; and at least one processor coupled to the external interface and the memory, the at least one processor configured by the instructions stored in memory to: receive via the external interface from a Network Exposure Function (NEF) a location request for a UE, wherein the NEF received the location request from another entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either a Gateway Mobile Location Center (GMLC) or the serving AMF for the UE to obtain a UE location, wherein the GMLC employs a location server to obtain the UE location, wherein the serving AMF obtains the UE location from a serving Radio Access Network (RAN) for the UE, wherein the NEF determined the serving AMF based on at least one of the type of location request, the required location accuracy, the required location response time and whether the PLMN supports location of UEs using a GMLC or a serving AMF; send via the external interface the location request to the serving RAN for the UE; receive via the external interface the UE location or a confirmation of the location request from the serving RAN; and send via the external interface the UE location or the confirmation of the location request to the NEF.

In one implementation, a serving Access and Mobility Management Function (AMF) for a user equipment (UE) for supporting location services for the UE, includes: means for receiving from a Network Exposure Function (NEF) a location request for the UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; means for sending the location request to the serving RAN for the UE; means for receiving the UE location or a confirmation of the location request from the serving RAN; and means for sending the UE location or the confirmation of the location request to the NEF.

In one implementation, a non-transitory computer readable medium comprising instructions, which when executed by a processor of a serving Access and Mobility Management Function (AMF) for supporting location services for a user equipment (UE), cause the processor to: receive from a Network Exposure Function (NEF) a location request for the UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; send the location request to the serving RAN for the UE; receive the UE location or a confirmation of the location request from the serving RAN; and send the UE location or the confirmation of the location request to the NEF.

In one implementation, a method for supporting location services for a user equipment (UE) performed by a serving base station for the UE, the serving base station being in a serving Radio Access Network (RAN) for the UE, includes receiving from a serving Access and Mobility Management Function (AMF) for the UE a location request for the UE, wherein the serving AMF received the location request from a Network Exposure Function (NEF), the NEF received the location request from another entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either a Gateway Mobile Location Center (GMLC) or the serving AMF for the UE to obtain a UE location, wherein the GMLC employs a location server to obtain the UE location, wherein the serving AMF obtains the UE location from the serving RAN for the UE, wherein the NEF determined the serving AMF based on at least one of the type of location request, the required location accuracy, the required location response time and whether the PLMN supports location of UEs using a GMLC or a serving AMF; obtaining the UE location; and sending the UE location to the serving AMF.

In one implementation, a serving base station for user equipment (UE), the serving base station being in a serving Radio Access Network (RAN) for the UE for supporting location services for the UE, the serving base station includes an external interface for receiving and sending messages to entities in a network; memory configured to store instructions; and at least one processor coupled to the external interface and the memory, the at least one processor configured by the instructions stored in memory to: receive via the external interface from a serving Access and Mobility Management Function (AMF) for the UE a location request for the UE, wherein the serving AMF received the location request from a Network Exposure Function (NEF), the NEF received the location request from another entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either a Gateway Mobile Location Center (GMLC) or the serving AMF for the UE to obtain a UE location, wherein the GMLC employs a location server to obtain the UE location, wherein the serving AMF obtains the UE location from the serving RAN for the UE, wherein the NEF determined the serving AMF based on at least one of the type of location request, the required location accuracy, the required location response time and whether the PLMN supports location of UEs using a GMLC or a serving AMF; obtain the UE location; and send via the external interface the UE location to the serving AMF.

In one implementation, a serving base station for user equipment (UE), the serving base station being in a serving Radio Access Network (RAN) for the UE for supporting location services for the UE, the serving base station includes: means for receiving from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; means for obtaining the UE location; and means for sending the UE location to the serving AMF.

In one implementation, a non-transitory computer readable medium comprising instructions, which when executed by a processor of a serving base station for user equipment (UE), the serving base station being in a serving Radio Access Network (RAN) for the UE for supporting location services for the UE, cause the processor to: receive from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; obtain the UE location; and send the UE location to the serving AMF.

BRIEF DESCRIPTION OF THE DRAWINGS

An understanding of the nature and advantages of various embodiments may be realized by reference to the following figures.

Figure 1:
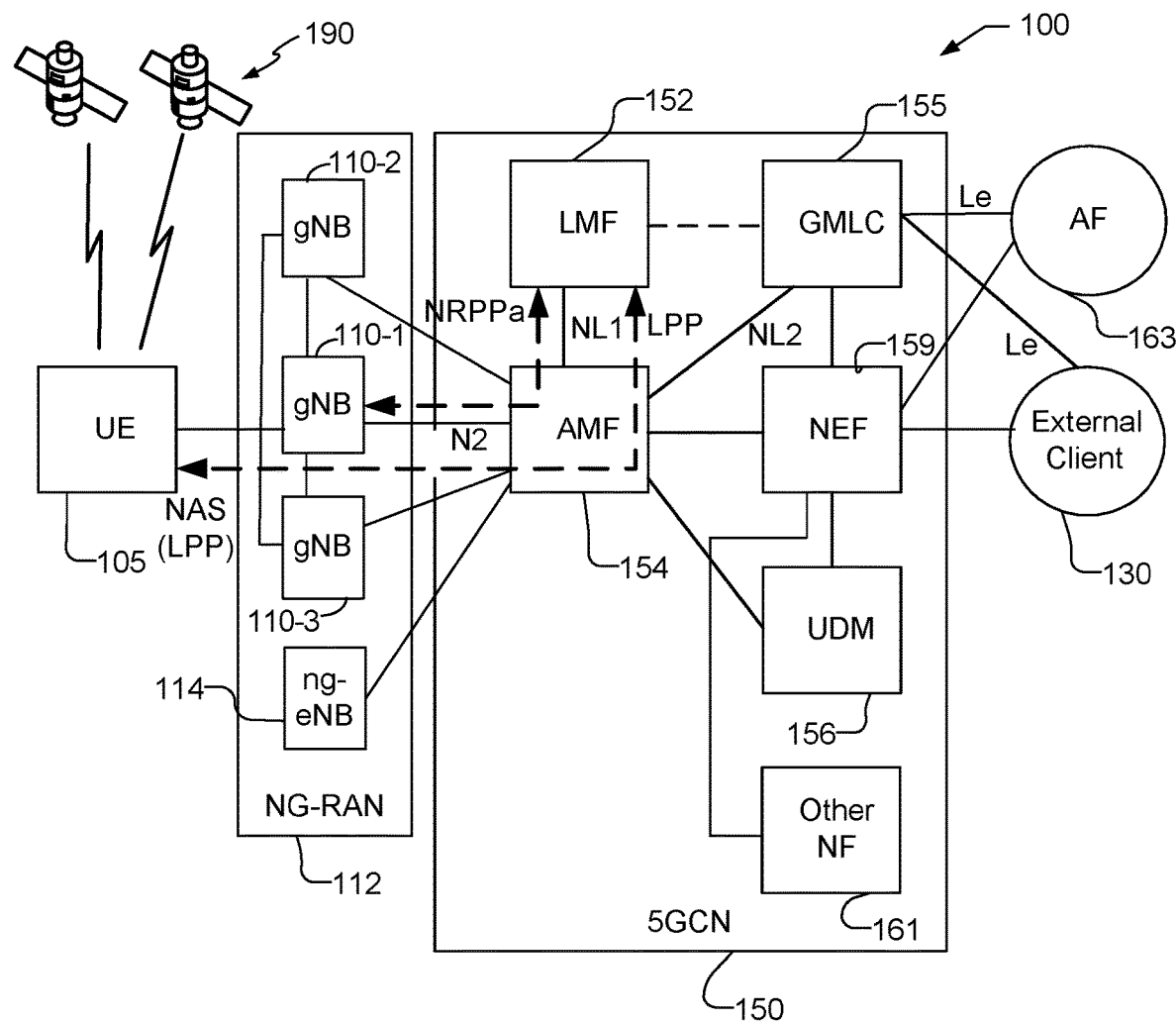
FIG. 1 is a block diagram illustrating a non-roaming reference architecture for a 5G unified location solution in a wireless network.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 155 may be indicated as 155V, 155H, 155X. When referring to such an element using only the first number, any instance of the element is to be understood (e.g. element 110 in the previous example would refer to elements 110-1, 110-2 and 110-3, and element 155 in the previous example would refer to elements 155V, 155H, and 155X).

DETAILED DESCRIPTION

Location of a UE with Fifth Generation (5G) network access can be enabled in several ways. With a GMLC based location method, a control plane (CP) location solution can be used in which an external client or network function (NF) sends a location request for a target UE to a GMLC. The GMLC then sends the location request to a serving AMF for the target UE, which forwards the location request to an LMF. The LMF can then employ UE positioning methods using LPP and/or network based position methods using NRPPa to obtain the UE location, which is returned to the external client or NF via the AMF and GMLC. In a variant of the GMLC location method, the GMLC could bypass the AMF and send the location request directly to the LMF with the LMF later returning the obtained location back to the GMLC.

With a second method (referred to as an "AMF location" method, an "AMF based location" method or an "AMF location event exposure service"), an external client, external AF or NF may send a location request for a target UE to some central NF in a 5G Core Network (5GCN), such as a Network Exposure Function (NEF), which then subscribes to receiving one or more location reports for the target UE from a serving AMF for the target UE. The serving AMF in turn may request one or more location reports for the target UE from a Next Generation Radio Access Network (NG-RAN). The NG-RAN provides the location report(s) with the accuracy of a cell area or Tracking Area (TA) to the AMF, which returns the report(s) to the external client, external AF or NF via the central NF.

One problem with these two methods is that an external client, external AF or 5GCN NF client could have to support requests and responses for both methods if both methods are to be used. For example, not all networks may support both methods and one method may have higher latency and/or lower accuracy than the other method. So there may be occasions when one method rather than the other is preferred or required. Hence, both methods may have to be supported.

To overcome these problems, a unified method of supporting the location of a target UE may be used, which may be referred to as a Unified NEF Location Service Exposure solution or method. With this, an NEF may serve as a focal point for any location service request sent by an external client, internal Network Function (NF), or internal or external Application Function (AF). The solution may enable use of both a GMLC based location method and an AMF based location method using an AMF Event Exposure service operation, which may be enhanced to enable more accurate location of a target UE. An NEF may provide a unified exposure to both location methods to a consumer NF via a service based interface (SBI) and to a consumer AF via an application program interface (API). This may enable a network operator to offer location services to NFs and AFs using either one of the GMLC location method or AMF location method or using both methods without impacting the SBI or API used by an NF or AF to access the NEF. In addition, by supporting a single unified SBI and API at an NEF, an optimal choice of methods may be supported by the NEF (e.g. dependent on location accuracy and latency requirements) without impacting an AF or NF.

In more detail, NFs and AFs could access UE location information via an NEF using the AMF Event Exposure service operations. As defined in the Third Generation Partnership Project (3GPP) Technical Specification (TS) 23.502, an NEF can subscribe to reporting of location events for a UE from a serving AMF on behalf of another NF. As defined in 3GPP TS 29.518, the location event can be a one-time report of a last know or current location or a series of reports of a current or last known location triggered by changes in UE location such as a change of cell ID or entry into or exit from some area of interest. The location granularity could be equivalent to the area of a cell or tracking area (TA). This service may map directly to that provided by the GMLC location method for a current or last known UE location or for periodic or triggered UE location, e.g. based on a motion event or area event (e.g. as defined in 3GPP TS 23.271).

It could therefore be useful to combine both forms of location support (using a GMLC location method and AMF location method) in an NEF to enable a unified location service to be provided to a consumer NF or AF using a common SBI for an NF or a common API for an AF. With this, an external client, AF or other NF that needs the location of a UE may send a location request to an NEF in the home PLMN or VPLMN for the UE. The location request may include, e.g., a type of location request, a required location accuracy, a required location response time, etc. Based on at least one of these parameters and the capability of the network to support a GMLC location method and/or an AMF location method, the NEF may determine whether to use (i) the GMLC location method (and/or may determine a GMLC), or (ii) the AMF location method (and/or may determine a serving AMF). For the GMLC location method, the NEF may forward the location request to a GMLC which in turn forwards the location request to an AMF or LMF. For the AMF location method, the NEF may forward the location request in the form of a subscription request for UE location to the serving AMF. If the NEF does not know the serving AMF for the UE for the AMF location method, the NEF may query a UDM in the home network for the UE for the serving AMF address or may send the subscription request to the AMF via the UDM for the UE, which may know the serving AMF address for the UE following a previous UE registration.

The unified location service may have several benefits. For example, one common SBI or API can be provided by an NEF for all location service access, thereby reducing impacts for location service access. In addition, an NEF could make a better decision than a consumer NF or AF regarding usage of a GMLC versus AMF location method for obtaining UE location, since an NEF can be configured with all appropriate information and can run some optimized decision logic. With another benefit, a network operator could choose not to deploy a GMLC based location method or not to deploy an AMF location based method without affecting how consumer NFs and AFs access location services. Further, a decision by an NEF regarding GMLC versus AMF location methods may allow for network maintenance and network loading without impacting consumer NFs and AFs.

As a consequence of providing an AMF location method for UE location reporting via an NEF to consumer NFs and AFs, it may also be beneficial to improve location accuracy for the AMF location method beyond that allowed by cell ID granularity using an enhanced AMF location method. For example, in an enhanced AMF location method, a serving base station for a UE, such as an ng-eNB or gNB, may determine a UE location by obtaining one or more of (i) location measurements made by the UE of one or more gNBs, ng-eNBs and/or eNBs, (ii) a location estimate obtained by the UE, (iii) location measurements of signals transmitted by the UE obtained by a serving gNB or ng-eNB, and/or (iv) location measurements of signals transmitted by the UE obtained by other gNBs and/or ng-eNBs and forwarded to a serving gNB or ng-eNB. The measurement procedure may be controlled using an RRC protocol between the UE and a serving gNB or ng-eNB. A serving base station may include a location server function (or the location server function is included in a separate location server accessible from the serving base station). The serving base station may then return the UE location to the AMF. Position methods that may be supported by the serving base station may include, e.g., Observed Time Difference Of Arrival (OTDOA), round trip signal propagation time (RTT), angle of departure (AOD), angle of arrival (AOA), Assisted Global Navigation Satellite System (A-GNSS) and Real Time Kinematic (RTK). Thus, the need for a GMLC and/or LMF may be avoided with the enhanced AMF location method, which may reduce the cost and complexity of location support by a network.

FIG. 1 is a simplified block diagram illustrating a communication system 100 for non-roaming support of a 5G unified CP location solution. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs (also referred to as gNBs) 110-1, 110-2 and 110-3 (collectively and generically referred to herein as gNBs 110), and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as an Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a RAN, denoted by the term "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as Global System for Mobile Communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, and/or receiving wireless signals from a cellular transceiver, in the NG-RAN 112, such as a gNB 110. A transceiver provides user and control plane protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS ephemeris information) received from a location server (e.g. LMF 152) or broadcast by a base station (e.g. a gNB 110) in NG-RAN 112 to determine a location for UE 105.

In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G NR. In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved NodeBs (eNBs), or other types of base stations or access points. As an example, NG-RAN 112 may include one or more next generation eNBs (ng-eNBs) 114 which provide LTE wireless access to UE 105 and may connect to entities in 5GCN 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105; NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location service requests for the UE 105, e.g., received from the GMLC 155 or from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support one or more GMLC location methods for obtaining a location of a UE 105. With a GMLC location method, GMLC 155 may support a location request for the UE 105 received from an external client 130 or from NEF 159 and may forward such a location request to the LMF 152 via the serving AMF 154 or directly. A location response from the LMF 152 (e.g. containing a location estimate for the UE 105) may be similarly returned to the GMLC 155 via the serving AMF 154 or directly, and the GMLC 155 may then return the location response (e.g., containing the location estimate) to the external client 130 or NEF 159. GMLC 155 may contain subscription information for an external client 130 and may authenticate and authorize a location request for UE 105 from external client 130. GMLC 155 may further initiate a location session for UE 105 by sending a location request for UE 105 to AMF 154 (e.g. which then forwards the request to LMF 152) and may include in the location request an identity for UE 105 and the type of location being requested (e.g. such as a current location or a sequence of periodic or triggered locations).

As further illustrated in FIG. 1, the LMF 152 and the gNBs 110 may communicate using a New Radio Position Protocol A (which may be referred to as NRPPa). NRPPa may be defined in 3GPP TS 38.455 and may be similar to, or an extension of, the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred inside Non-Access Stratum (NAS) transport messages between the UE 105 and the LMF 152 via the AMF 154 and a serving gNB 110-1 for UE 105. For example, LPP messages may be transferred between the LMF 152 and the AMF 154 using a transport protocol (e.g. IP based) or a service based operation (e.g. using the Hypertext Transfer Protocol (HTTP)), and may be transferred between the AMF 154 and the UE 105 using a NAS transport protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, RSRP and/or RSRQ for gNBs 110, ng-eNB 114 or WLAN APs, or measurements of GNSS pseudorange, code phase and/or carrier phase for SVs 190) and may send the measurements to a location server (e.g. LMF 152) for computation of a location estimate for UE 105. With a UE based position method, UE 105 may obtain location measurements (e.g. which may be the same as or similar to location measurements for a UE assisted position method)

and may then compute a location of UE 105 (e.g. with the help of assistance data received from a location server such as LMF 152 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the AMF 154. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130 for Internet of Things (IoT) UEs, a Network Exposure Function (NEF) 159 may be included in 5GCN 150. An NEF may also be referred to as a Service Capability Exposure Function (SCEF), e.g. for a UE 105 with LTE access to an EPC rather than 5G NR radio access to 5GCN 150. The NEF 159 may support secure exposure of capabilities and events concerning 5GCN 150 and UE 105 to an external client 130 or AF 163 and may enable secure provision of information from external client 130 or AF 163 to 5GCN 150. In the context of location services, NEF 159 may function to obtain a current or last known location for a UE 105, may obtain an indication of a change in location for a UE 105, or an indication of when a UE 105 becomes available (or reachable). An external client 130 or external AF 163 may access NEF 159 directly or may access a Services Capability Server (SCS, not shown in FIG. 1), which may access NEF 159 on behalf of external client 130 in order to provide location information to the external client 130 or AF 163 for UE 105 via the SCS. The NEF 159 may be connected to the GMLC 155 to support last known location, current location and/or deferred periodic and triggered location for the UE 105 using a GMLC location method supported by GMLC 155. If desired, the NEF 159 may include, or may be combined with, the GMLC 155 and may then obtain location information for UE 105 directly from LMF 152 (e.g. may be connected to LMF 152). NEF 159 may also be connected to AMF 154 and/or to UDM 156 to enable NEF 159 to obtain a location for UE 105 from the AMF 154 using the AMF location method referred to previously.

The external client 130, AF 163 or a Network Function (NF) 161 in 5GCN 150 that wants the location of the UE 105 may send a location service request to the NEF 159 instead of to the GMLC 155. The location service request may include a required location accuracy. Based on the required location accuracy and the availability and capability of 5GCN 150 to support the GMLC and AMF location methods, the NEF 159 determines whether to use a GMLC location method or an AMF location method. For a GMLC location method, the NEF 159 forwards the location request to the GMLC 155 which in turn forwards the location request to the serving AMF 154, which forwards the location request to the LMF 152, or the NEF 159 sends the location request directly to the LMF 152, as described previously. For an AMF location method, the NEF 159 forwards the location request in the form of a subscription request for UE location to the serving AMF 154 as described previously. If the NEF 159 does not know the serving AMF for the UE 105 for the AMF location method, the NEF 159 may query the UDM 156 for the UE 105 for the serving AMF address or may send the subscription request to the serving AMF 154 via the UDM 156 for the UE 105, which may know the serving AMF address for the UE 105 following a previous UE registration. This may allow the external client 130, AF 163 or client NF 161 to support only one type of location request with an NEF 159 rather than two types of location request for the GMLC and AMF location methods. Additionally, the NEF 159 can be better able to select the location method than the external client 130, AF 163 or NF 161 because the NEF 159 can be configured with more information than an external client 130, AF 163 or NF 161 and can thus make a better choice of method based on a required location accuracy, latency and/or reliability.

Additionally, if an AMF location method is used, the AMF location method may be enhanced to support more accurate UE location. For example, the serving ng-eNB 114 or gNB 110-1 for the UE 105 may obtain a UE location by obtaining one or more of (i) location measurements made by the UE 105 of one or more gNBs 110, ng-eNBs 114 and/or eNBs (not shown in FIG. 1), (ii) a location estimate obtained by the UE 105, (iii) location measurements of signals transmitted by the UE 105 obtained by the serving gNB 110-1 or ng-eNB 114, and/or (iv) location measurements of signals transmitted by the UE 105 obtained by other gNBs 110 and/or other ng-eNBs 114 and forwarded to the serving gNB 110-1 or serving ng-eNB 114. The measurement procedure may be controlled using the RRC protocol between the UE 105 and the serving gNB 110-1 or ng-eNB 114. The serving gNB 110-1 and/or ng-eNB 114 then returns the UE location to the AMF 154, which may return the UE location to the NEF 159. The serving gNB 110-1 or ng-eNB 114 may contain a location server capability (or the capability is included in a separate location server accessible from the serving gNB 110-1 or ng-eNB 114). Position methods that may be supported can include OTDOA, RTT, AOD, AOA, A-GNSS and RTK. Thus, the need for the GMLC 155 and LMF 152 may be obviated, thereby reducing the cost and complexity of network location support.

Figure 2:
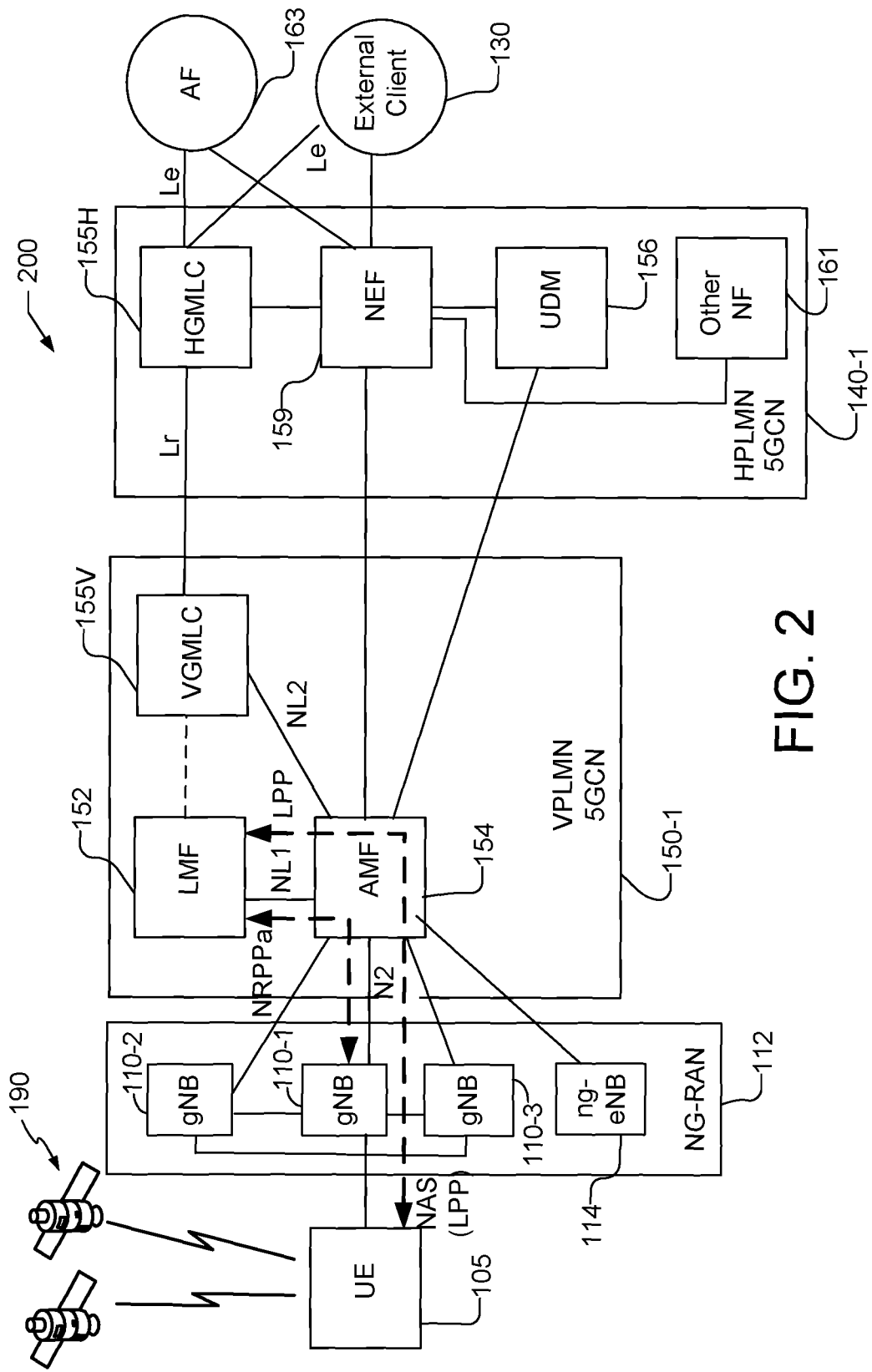
FIG. 2 is a block diagram illustrating a roaming reference architecture for a 5G unified location solution in a wireless network.

FIG. 2 illustrates a communication system 200 that is similar to the communication system 100 shown in FIG. 1, but supports location for a roaming UE 105. In the communication system 200, the core network 5GCN 150-1 that is in communication with the UE 105 via the NG-RAN 112 is a visited network, i.e., Visited Public Land Mobile Network (VPLMN), which is in communication with a home network 5GCN, i.e., Home Public Land Mobile Network (HPLMN) 140-1. In communication system 200, the VPLMN 5GCN 150-1 includes the Location Management Function (LMF) 152. The LMF 152 in communication system 200 may perform the same or almost the same functions and operations as LMF 152 in the non-roaming communication system of FIG. 1. The VPLMN 5GCN 150-1 also includes a Visited Gateway Mobile Location Center (VGMLC) 155V, which is similar to the GMLC 155 in the non-roaming communication system of FIG. 1, and is designated as 155V to indicate that it is located in the visited network for UE 105. As illustrated in FIG. 2, the VGMLC 155V connects to the AMF 154 and may connect to the LMF 152 in the VPLMN 5GCN 150-1.

As illustrated, HPLMN 5GCN 140-1 may include a Home GMLC (HGMLC) 155H that may be connected to the VGMLC 155V (e.g., via the Internet). The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130 in the HPLMN 140-1 and optionally with AF 163. The NEF 159 may also be in communication with the external client 130 and/or AF 163 and may operate as NEF 159 as discussed in FIG. 1. The NEF 159 may provide location access to UE 105 on behalf of external clients such as external client 130 and/or AF 163 as discussed in FIG. 1. One or more of the NEF 159 and HGMLC 155H may be connected to external client 130 and/or AF 163, e.g., through another network, such as the Internet. In some cases, an NF 161 in HPLMN 140-1 may request the location of UE 105 from NEF 159 as discussed in FIG. 1.

Figure 3:
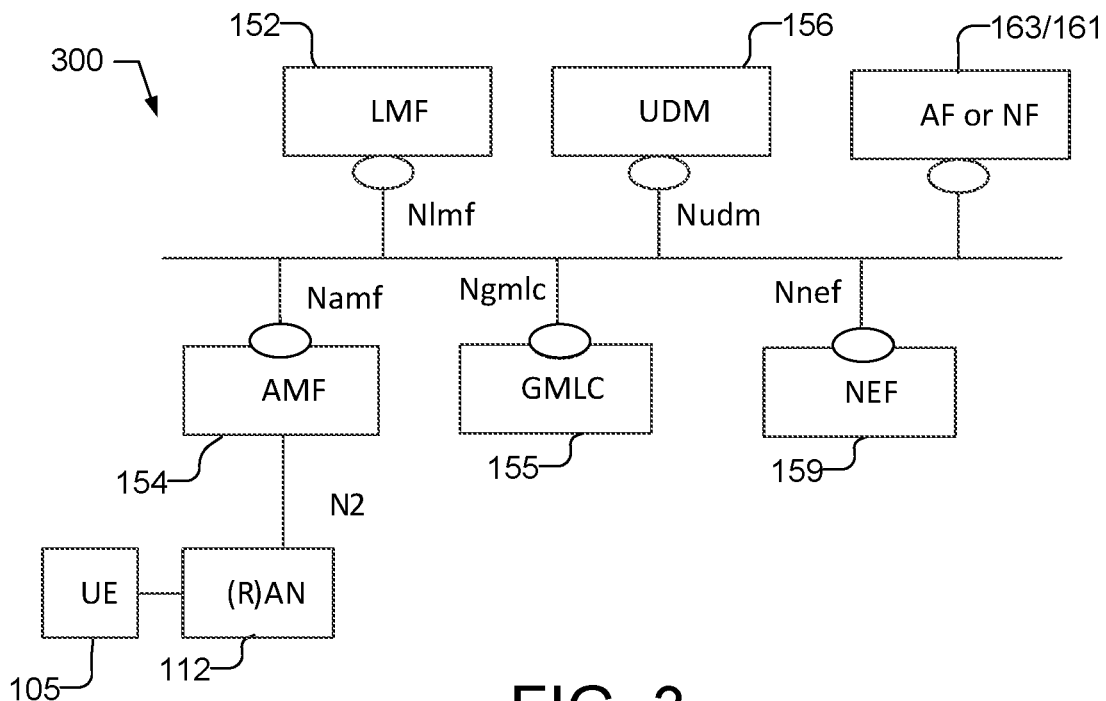
FIGS. 3 and 4 are block diagrams illustrating non-roaming and roaming reference architectures for a unified NEF location exposure solution.
Figure 4:
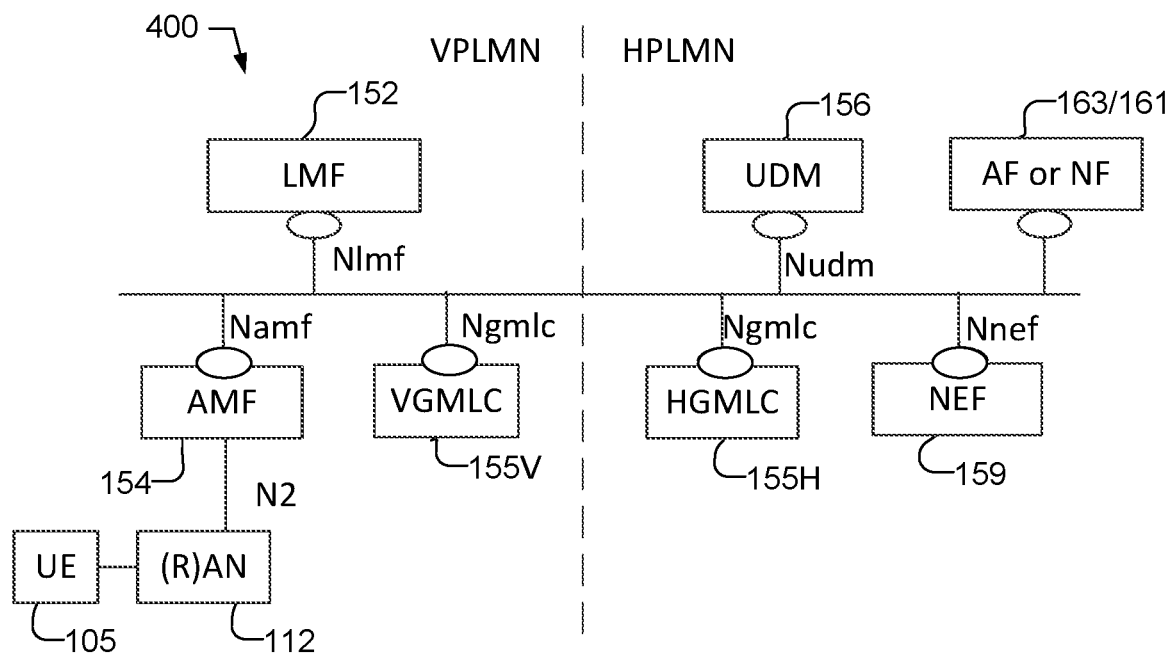

FIGS. 3 and 4 respectively illustrate a non-roaming reference architecture 300 for unified NEF location exposure and a roaming reference architecture 400 for unified NEF location exposure. The reference architectures 300 and 400 show service based interfaces (SBIs) in which a serving NF (e.g. AMF 154 or LMF 152) provides a common SBI (e.g. an Namf SBI in the case of AMF 154 or an Nlmf SBI in the case of LMF 152) to one or more consumer NFs. Furthermore, the reference architectures 300 and 400 mainly show NFs that function as serving and/or consumer NFs with respect to location support. The non-roaming and roaming reference architectures 300 and 400 also correspond to the non-roaming communication system 100 (shown in FIG. 1) and the roaming communication system 200 shown in FIG. 2, respectively, with like designated elements being the same. FIGS. 3 and 4 provide a high level indication of how the NEF 159 may be the focal point for location service requests. As illustrated in FIGS. 3 and 4, SBIs for location services are identified as Ngmlc for the SBI exhibited by a GMLC (e.g. GMLC 155, VGMLC 155V, and HGMLC 155H), Nlmf for the SBI exhibited by an LMF (e.g. LMF 152), Nudm for the SBI exhibited by a UDM (e.g. UDM 156), Namf for the SBI exhibited by an AMF (e.g. AMF 154), and Nnef for the SBI exhibited by an NEF, (e.g., NEF 159).

As illustrated in FIGS. 1 and 3 for non-roaming scenarios and in FIGS. 2 and 4 for roaming scenarios, the 5GCN location architectures differ from traditional location solutions (as described in 3GPP TS 23.271) in that the NEF 159 can serve as the focal point for any location request rather than the GMLC 155. One advantage of this is that an external client 130, AF 163 or client NF 161 may support only one type of location request with the NEF 159 rather than supporting one type of location request with the GMLC 155 and another type of location request with the NEF 159. Additionally, the NEF 159 may be better able to select the location method because an NEF 159 can be configured with more information than an external client 130, AF 163 or other NF 161 and can thus make a better choice of method based on a required location accuracy, latency and/or reliability.

Additionally, the AMF location method may be enhanced to support more accurate UE location by the serving ng-eNB 114 or gNB 110-1 (shown in FIGS. 1 and 2) for a UE 105 by including a location server capability or location server function in the ng-eNB 114 or gNB 110-1. The location server capability or location server function in the ng-eNB 114 or gNB 110-1 may determine the UE 105 location by obtaining one or more of (i) location measurements made by the UE 105 of one or more gNBs 110, ng-eNBs 114 and/or eNBs, (ii) a location estimate obtained by the UE 105, (iii) location measurements of signals transmitted by the UE 105 obtained by the serving gNB 110-1 or ng-eNB 114, and/or (iv) location measurements of signals transmitted by the UE 105 obtained by other gNBs 110 and/or other ng-eNBs 114 and forwarded to the serving gNB 110-1 or serving ng-eNB 114. This may remove the need for the GMLC(s) 155 and/or LMF 152 and may therefore reduce the cost and complexity of PLMN location support.

An external client 130, external AF 163 or internal NF 161 may need to collect the UE's 105 positioning information. The NEF 159 may then expose the UE location information to the external client 130, AF 163 or NF 161. The external client 130, AF 163 or NF 161 may send the location request message to NEF 159 and NEF 159 may decide to retrieve UE 105 location information via AMF 154 or GMLC 155 according to the required UE location accuracy, latency and reliability.

Figure 5:
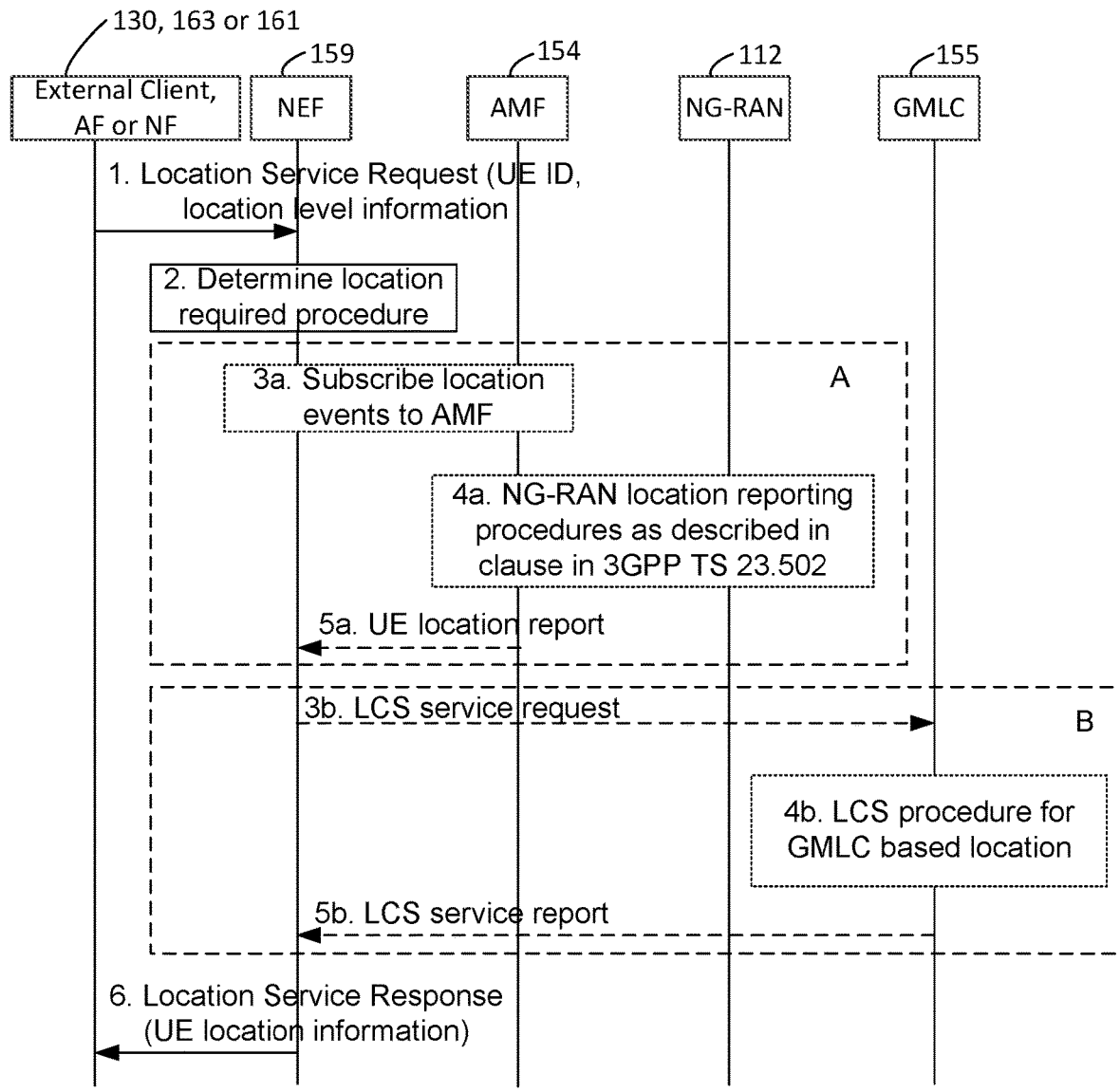
FIG. 5 illustrates an NEF exposure UE location information procedure.

FIG. 5 illustrates a procedure for unified NEF location exposure of UE location information. In FIG. 5, the NEF exposure of UE location information procedure includes the following stages.

At stage 1 in FIG. 5, the external client 130, AF 163 or NF 161 subscribes to the Location Service Request (UE ID, Location Accuracy Level Information) message to the NEF 159. Location Level Information may include the report events and UE location accuracy information, i.e. per Tracking Area (TA) level, Cell level or geographic level.

At stage 2, NEF 159 decides the location required procedure according to the Location Accuracy Level Information in stage 1.

If the requested UE location granularity is per TA or cell ID level, stage 3a to stage 5a are performed.

At stage 3a, NEF 159 subscribes to receiving location events for UE 105 from AMF 154 that is serving the UE 105. More details for this stage are described below.

At stage 4a, AMF 154 may send a location reporting control message to NG-RAN 112 to request location information for UE 105. If so, NG-RAN 112 returns a Location Report message informing the AMF 154 about the location of UE 105. The details for the procedure may be as described in 3GPP TS 23.502. The NG-RAN 112 may use procedures to obtain a more accurate UE location by obtaining measurements of UE signals and/or by obtaining measurements from the UE 105 of measurements made by the UE of signals from the NG-RAN 112.

At stage 5a, AMF 154 sends a UE location report to the NEF 159 containing a location estimate for UE 105.

If the requested UE location is for more precise granularity than cell ID, stage 3b to stage 5b may be performed.

At stage 3b, NEF 159 sends a Location Services (LCS) service request to the GMLC 155. UE ID and Location Level Information may be included in this message.

At stage 4b, the GMLC 155 may perform a GMLC location method by sending a location request to AMF 154, with AMF 154 then forwarding the location request to LMF 152. LMF 152 may then obtain the UE 105 location (e.g. using A-GNSS, RTK, OTDOA, ECID, AOA, RTT and/or AOD) and may return the location to GMLC 155 either via AMF 154 or directly.

At stage 5b, GMLC 155 reports UE location information to NEF 159.

At stage 6, NEF 159 sends the UE location information to the external client 130, AF 163 or NF 161.

For the NEF 159 to subscribe to receiving location events for UE 105 from AMF 154 at stage 3a in FIG. 5, if NEF 159 knows the served AMF 154 for the UE 105, the NEF 159 may subscribe to UE location information from the AMF 154 directly to AMF 154. For example, the Namf_EventExposure service in 3GPP TS 23.502 can be used to subscribe to the UE location information from AMF 154. The consumer of this service is NEF 159.

For the NEF 159 to subscribe to receiving location events for UE 105 from AMF 154 at stage 3a in FIG. 5, if NEF 159 does not know the served AMF 154 for the UE 105, NEF 159 may send the subscribe request message to the UDM 156. A Subscription Permanent Identifier (SUPI) for UE 105 may be included in the subscribe request message. UDM 156 may then discover the served AMF 154 for the UE 105 and may send a subscribe event request for UE 105 to the AMF 154.

Figure 6:
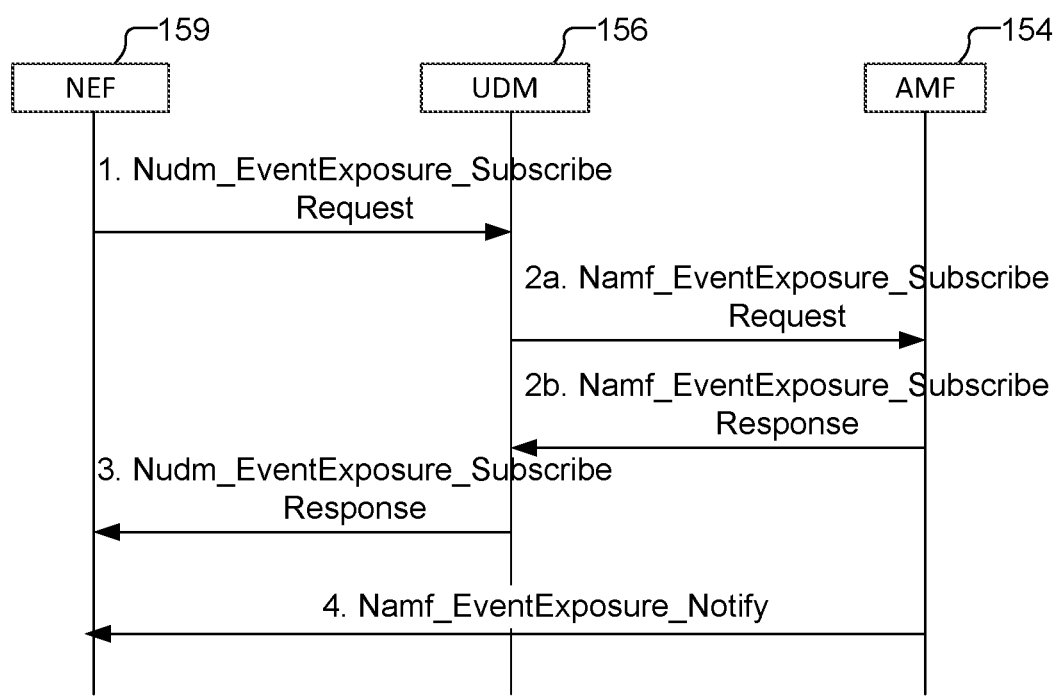
FIG. 6 illustrates an NEF obtaining UE location information via a UDM.

FIG. 6 illustrates a procedure in which NEF 159 requests UE location information via UDM 156. In FIG. 6, the procedure for the NEF 159 to request UE 105 location information via UDM 156 includes the following stages.

At stage 1 in FIG. 6, the NEF 159 subscribes to monitoring events for UE 105 by sending an Nudm_EventExposure_Subscribe request (including SUPI and Event Reporting Information) message to the UDM 156. Event Reporting Information indicates reporting of UE 105 location information.

At stage 2a, UDM 156 sends an Namf_EventExposure subscribe request to the serving AMF 154. The Event Reporting Information is included in the message and indicates location event reporting for UE 105 and indicates NEF 159.

At stage 2b, AMF 154 acknowledges the receipt and acceptance of the Namf_EventExposure_Subscribe request to UDM 156.

At stage 3, UDM 156 acknowledges the receipt and acceptance of the Nudm_EventExposure_Subscribe request to NEF 159.

At stage 4, after AMF 154 has obtained location information (e.g. a location estimate) for UE 105, AMF 154 sends an Namf_EventExposure_Notify message to NEF 159 and includes the UE 105 location information.

Figure 7:
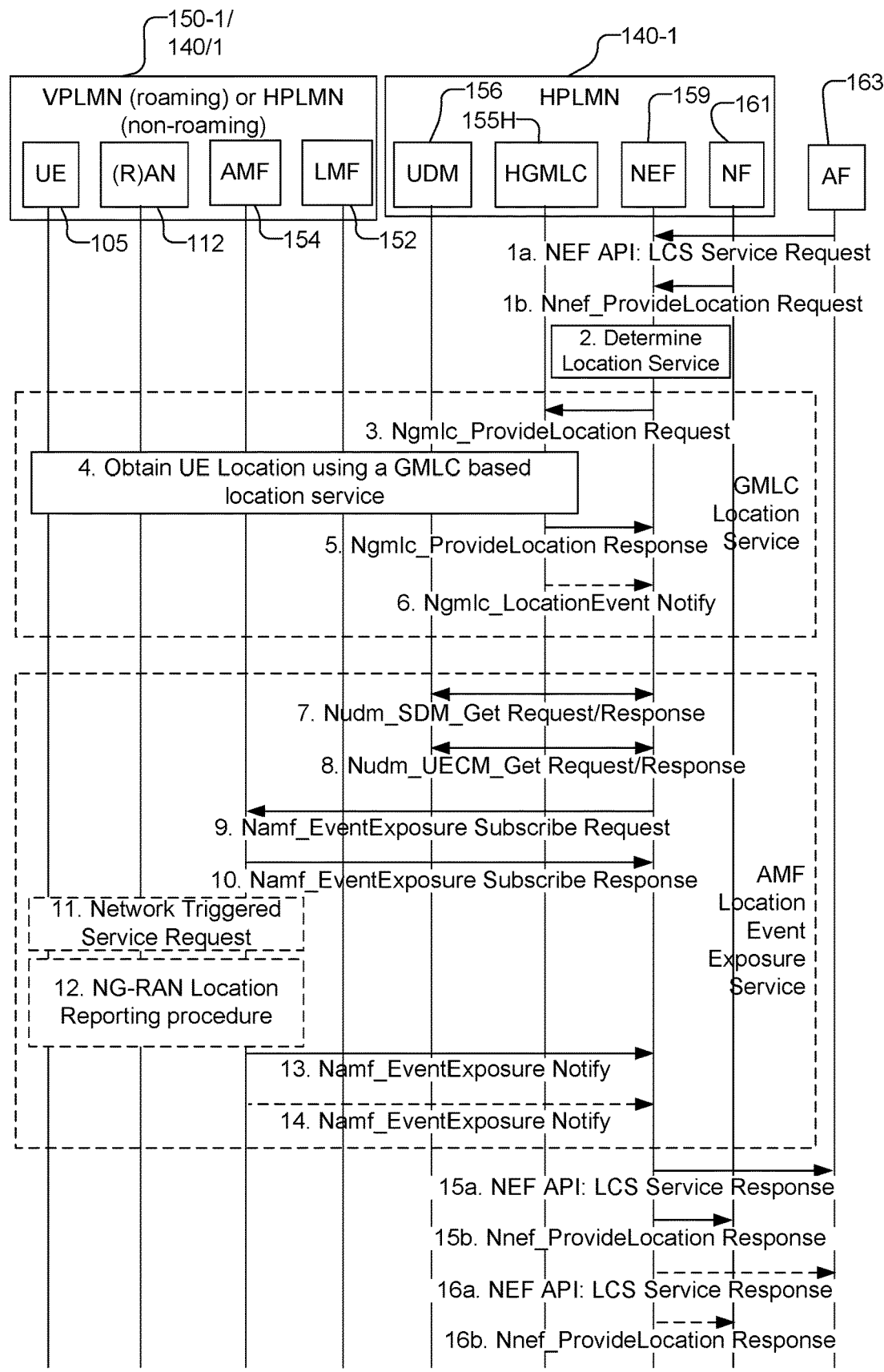
FIG. 7 illustrates a unified location service exposure procedure provided by an NEF in an HPLMN for a target UE to a consumer NF in the HPLMN or to a consumer AF outside the HPLMN.

FIG. 7 illustrates a unified location service exposure procedure provided by an NEF, such as NEF 159, in an HPLMN 140-1 for a target UE 105 to a NF 161 in the HPLMN 140-1 or to a external AF 163 outside the HPLMN 140-1. The procedure enables a request for an immediate location or for a deferred location for a target UE 105. In FIG. 7, the procedure for the unified NEF location service exposure includes the following stages.

At stage 1a in FIG. 7, an external AF 163 sends an LCS Service Request to an NEF 159 in the HPLMN 140-1 for a target UE 105 using an NEF API and includes an identification of the UE 105 (e.g. SUPI or Generic Public Subscription Identifier (GPSI)) and details of the location request such as whether a current or last known immediate location or a deferred location is requested, the location accuracy and response time (e.g. which may be part of a location Quality of Service (QoS)), Location Deferred Request (LDR) information for a request for deferred location and other information application to the type of request.

At stage 1b, as an alternative to stage 1a, a consumer NF 161 in the HPLMN 140-1 for a target UE 105 invokes an Nnef_ProvideLocation Request service operation towards an NEF 159 in the HPLMN 140-1 and includes a global identification of the UE 105 (e.g. SUPI or GPSI) and details of the location request as in stage 1a.

At stage 2, based on the service requirements in stage 1a or stage 1b (e.g. location QoS and whether an immediate or deferred location is requested) and on the level of HPLMN 140-1 support for GMLC versus AMF based location methods, the NEF 159 determines whether the location request in stage 1a or stage 1b can be mapped to a GMLC based location method or to an AMF location method (e.g. an AMF location event exposure service). The NEF 159 may determine to use whichever mapping is supported or, when both mappings are supported, may employ implementation or operator dependent procedures to make a choice. When a GMLC based location method is determined, stages 3-6 are performed and stages 7-14 are omitted. When an AMF location event exposure service is determined, stages 7-14 are performed and stages 3-6 are omitted. The NEF 159 may take the potential load to the system, e.g. AMF/UDM load, or GMLC load, into consideration when deciding which location service to use, or whether to reject the request from NF 161 or AF 163. The NEF 159 may also take into account QoS. For example, when QoS accuracy exceeds cell ID, the GMLC location service may be used if available.

At stage 3, when a GMLC based location service is determined in stage 2, NEF 159 determines a GMLC, which in this example is HGMLC 155H in HPLMN 5GCN 140-1, and invokes an Ngmlc_ProvideLocation Request service operation towards HGMLC 155H. The service operation may include all of the information received from the AF 163 or NF 161 in stage 1a or 1b.

At stage 4, for a request for an immediate location, the HGMLC 155H may perform part of the 5GC-MT-LR procedure in clause 6.1.1 of 3GPP TS 23.273 in the case of regulatory location or part of the 5GC-MT-LR procedure in clause 6.1.2 of 3GPP TS 23.273 in the case of commercial location. For a request for deferred location, the H-GMLC may perform part of the deferred 5GC-MT-LR procedure for periodic, triggered or UE available location events in clause 6.3.1 of 3GPP TS 23.273. As an example, stage 4 may comprise a GMLC location method in which some or all of the following actions are performed: (i) HGMLC 155H forwards the location request received at stage 3 to either a VGMLC 155V (e.g. if UE 105 is roaming in a VPLMN 150-1) or a serving AMF 154 for UE 105 (e.g. if UE 105 is not roaming); (ii) the VGMLC 155V, if used, forwards the location request to the serving AMF 154; (iii) the serving AMF 154 forwards the location request to LMF 152 (or possibly to a location server in NG-RAN 112, which may be referred to as a local LMF or Location Management Component (LMC)) once UE 105 becomes reachable; (iv) the LMF 152 (or local LMF or LMC) either obtains a location estimate for UE 105 (e.g. using the LPP and/or NRPPa protocols to obtain location measurements or a location estimate for UE 105 from at least one of UE 105 and a serving RAN 112 for UE 105 and using one or more position methods like A-GNSS, RTK, OTDOA, RTT, ECID, AOD and/or AOD) or activates periodic or triggered location in UE 105 if a deferred location using periodic or triggered location is requested at stage 1; (v) LMF 152 (or the local LMF or LMC) returns to AMF 154 either a location estimate for UE 105 or a confirmation of activation of periodic or triggered location for UE 105; (vi) AMF 154 sends a location response to VGMLC 155V, if used, containing the location estimate or a confirmation of acceptance of a deferred location request for UE 105 (which may be sent prior to actions (iii), (iv) and (v)); and (vii) the AMF 154 (if VGMLC 155V is not used) or VGMLC 155V (if VGMLC 155V is used) sends a location response to HGMLC 155H containing the location estimate or confirmation of acceptance of a deferred location request for UE 105. Stage 4 may include additional actions such as: (viii) location notification and/or verification by AMF 154 to UE 105 either before or after action (iv); (ix) periodic or triggered event reporting by UE 105 to LMF 152 or another LMF, followed by optional location of UE 105, when periodic or triggered location was activated in UE 105 at action (iv) for periodic or triggered deferred location; and/or (x) forwarding of any periodic or triggered event reports (and location estimates) for UE 105 which occur (or are obtained) at action (ix) by LMF 152 or another LMF to HGMLC 155H either directly or via another GMLC such as VGMLC 155V. The various actions performed at stage 4 may conform to those applicable to a GMLC location method.

At stage 5, the HGMLC 155H invokes an Ngmlc_ProvideLocation Response service operation towards the NEF 159 to confirm the request in stage 3 for a request for deferred location or to return the UE location estimate for a request for an immediate location.

At stage 6, if deferred location was requested in stage 1, the HGMLC 155H may invoke one or more Ngmlc_LocationEvent Notify service operations towards the NEF 159 to convey a single UE 105 location in the case of deferred location for the UE available event or to convey an indication of location activation in UE 105 followed by one or more location event reports (and associated location estimates) in the case of deferred location for periodic or triggered location.

At stage 7, when an AMF location event exposure service is determined in stage 2, if the NEF 159 needs to verify the target UE 105 privacy requirements, the NEF 159 invokes a Nudm_SDM_Get service operation towards the UDM 156 for the target UE 105 to get the privacy settings of the UE 105 identified by its GPSI or SUPI. The UDM 156 returns the target UE Privacy setting and the SUPI of the UE. The NEF 159 checks the privacy settings. If the target UE 105 is not allowed to be located, stages 8-14 are skipped. The AMF location event exposure service may not support a real time query to the UE to verify UE privacy requirement. If the NEF finds this is needed, the NEF may select a GMLC location method (by invoking stages 3-6) or may return an error to the external AF 163 or NF 161.

At stage 8, the NEF 159 invokes a Nudm_UECM_Get service operation towards the UDM 156 of the target UE 105 with the SUPI of UE 105. The UDM 156 returns the network addresses of the current serving AMF 154. If the location request is an immediate location request, the NEF 159 may check the country codes of the serving node addresses. If the NEF 159 finds out the current AMF 154 locates out of the service coverage, the NEF returns an appropriate error message to the AF 163 or NF 161.

At stage 9, the NEF 159 invokes an Namf_EventExposure Subscribe service operation towards the serving AMF 154 for the target UE 105 and indicates whether a one-time UE location is requested or multiple UE locations for some triggering event and includes information on location accuracy (e.g. cell ID or TA granularity or a location QoS).

At stage 10, the AMF 154 acknowledges the request in stage 9.

At stage 11, if the UE 105 is currently reachable and in CM-IDLE state and if location is requested in stage 9 with a cell ID accuracy or higher, the AMF 154 performs a network triggered service request to place the UE 105 in CM-CONNECTED state.

At stage 12, if an immediate location is requested in stage 9 which the AMF 154 can support based on AMF 154 knowledge of the current or last known serving cell or serving TA for the UE (e.g. where the serving cell may have been received previously by AMF 154 from NG-RAN 112), the AMF 154 may convert the last known serving cell ID or serving TAI into a geodetic location estimate and proceeds to stage 13. Otherwise, the AMF 154 invokes an NG-RAN location reporting procedure to obtain a single location or multiple UE locations according to the request in stage 9. The NG-RAN 112 may obtain and return the location of UE 105 to AMF 154 based on a current or previous serving cell or TA for UE 105 or may obtain a more accurate location for UE 105 as described later in association with FIG. 9.

At stage 13, the AMF 154 invokes the Namf_EventExposure Notify service operation towards the NEF 159 to provide the current or last known UE 105 location as obtained at stage 12.

At stage 14, if the AMF 154 invokes the NG-RAN location reporting procedure in stage 12 to obtain multiple UE locations and receives multiple location reports from NG-RAN as part of stage 12, the AMF 154 invokes one or more additional Namf_EventExposure Notify service operations towards the NEF 159 to provide each additional UE 105 location provided by NG-RAN.

At stages 15a and 15b, the NEF 159 returns the first UE 105 location received at stage 5 or stage 13 or a confirmation of acceptance of a request for deferred location received at stage 5 in the case of using a GMLC location service to the external AF 163 (stage 15a) or NF 161 (stage 15b).

At stages 16a and 16b, if one or more additional location reports are received at stage 6 or stage 14, the NEF 159 returns one or more additional locations for UE 105 to the external AF 163 (stage 16a) or NF 161 (stage 16b).

Figure 8:
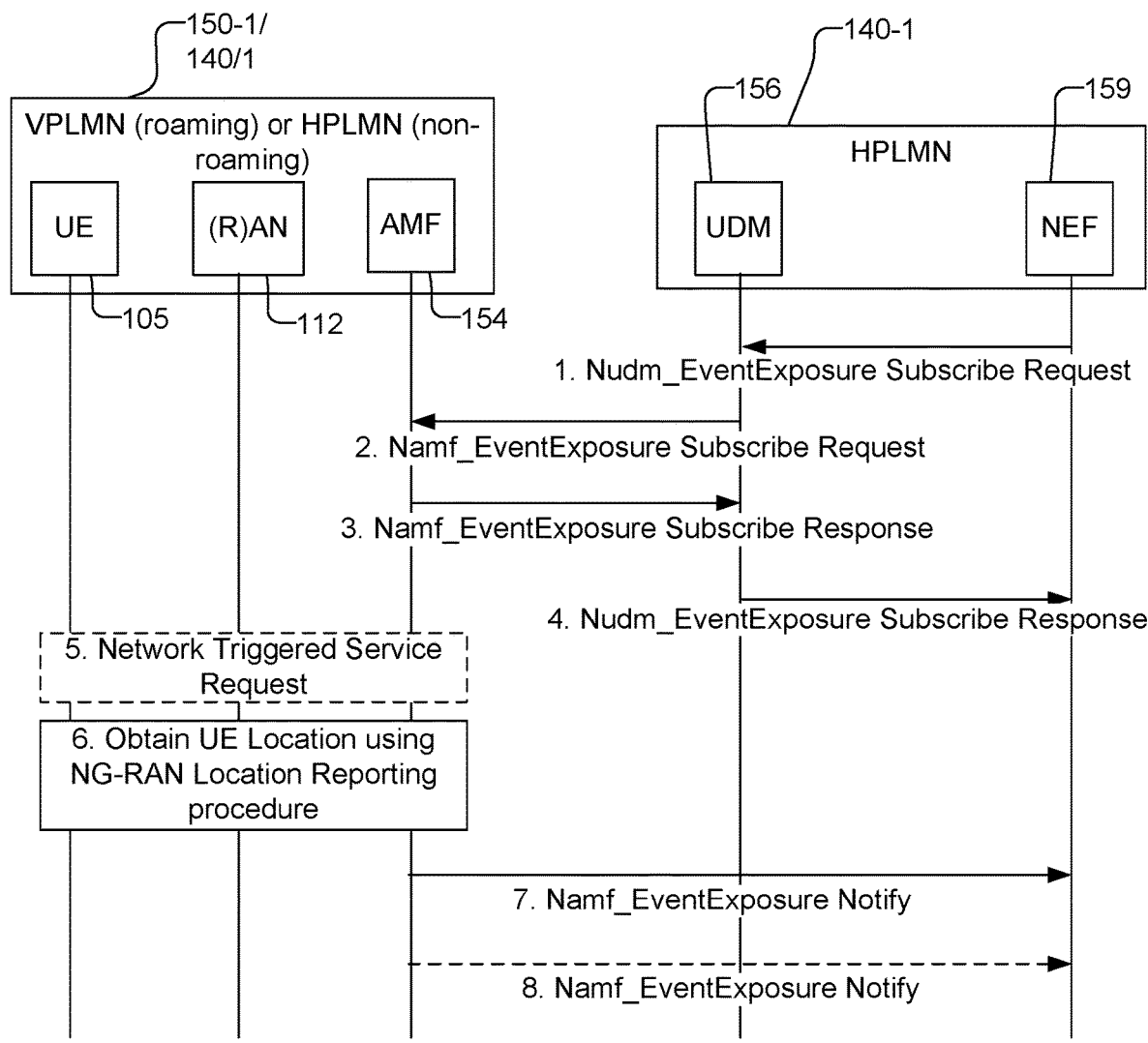
FIG. 8 illustrates a procedure used by the NEF to access the serving AMF for the UE when the NEF does not have the address of the serving AMF and when AMF location reporting is selected by the NEF.

FIG. 8 illustrates a procedure used by the NEF 159 to access the serving AMF 154 for the UE 105 when the NEF 159 does not have the address of the serving AMF 154 and when an AMF location event exposure service is selected by the NEF 159 (e.g. at stage 2 in FIG. 7). When this procedure is used, stages 1-8 in FIG. 8 may replace stages 8-14 in FIG. 7. The procedure shown in FIG. 8 includes the following stages.

At stage 1 in FIG. 8, the NEF 159 invokes an Nudm_EventExposure Subscribe service operation towards the UDM 156 for the target UE 105 for location reporting and indicates whether a one-time UE location is requested or multiple UE locations for some triggering event and includes the UE identity (SUPI or GPSI) and information on location accuracy (e.g. cell ID or TA granularity or a location QoS). A correlation identity (ID) (also referred to as a correlation identifier) is also included.

At stage 2, the UDM 156 invokes an Namf_EventExposure Subscribe service operation towards the serving AMF 154 for the target UE 105 for location reporting and includes the information received in the service operation for stage 1 including the correlation ID and a uniform resource identifier (URI) that identifies the NEF 159.

At stage 3, the AMF 154 sends an acknowledgment for the request in stage 2 to the UDM 156.

At stage 4, the UDM 156 sends an acknowledgment of the request in stage 1 to the NEF 159.

At stage 5, the AMF 154 performs a Network Triggered Service Request if needed as for stage 11 of FIG. 7.

At stage 6, the AMF 154 obtains a location of the UE 105 or invokes a location reporting procedure with NG-RAN 112 to obtain a UE location or multiple UE locations as for stage 12 of FIG. 7.

At stage 7, the AMF 154 invokes the Namf_EventExposure Notify service operation towards the NEF 159 indicated by the URI received in stage 2 and includes the first UE 105 location obtained at stage 6 and the correlation ID received at stage 2.

At stage 8, if the AMF 154 invokes a location reporting procedure with NG-RAN to obtain multiple UE locations at stage 6, the AMF 154 invokes one or more Namf_EventExposure Notify service operations towards the NEF 159 to provide each additional UE location as in stage 14 for FIG. 7.

Figure 9:
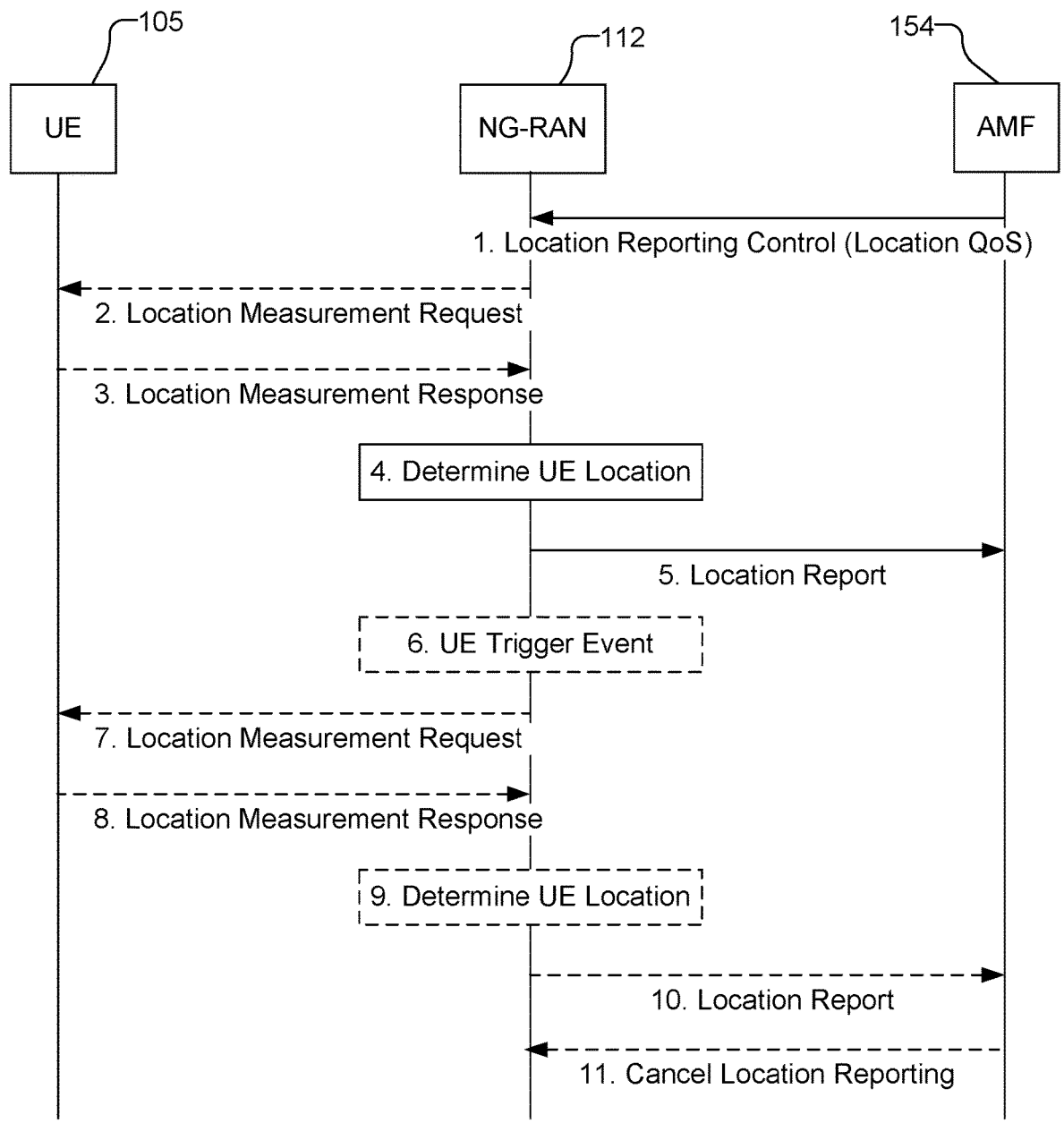
FIG. 9 illustrates a procedure used by a serving AMF to obtain a location estimate for the target UE from the NG-RAN with higher location accuracy than that possible using cell ID based location.

FIG. 9 illustrates a procedure that may be used by a serving AMF 154 to obtain a location estimate for the target UE 105 from the NG-RAN 112 with higher location accuracy than that possible using cell ID based location. The procedure could also be used for non-3GPP access (e.g. WLAN WiFi access) from a UE 105 if an N3IWF and AN replace the NG-RAN 112 in FIG. 7. The procedure may be used to extend and enhance NG-RAN Location reporting procedures defined in 3GPP TS 23.502 using Next Generation Application Protocol (NGAP) messages between the AMF 154 and NG-RAN 112 as defined in 3GPP TS 38.413. A precondition for the procedure shown in FIG. 9 may be that the UE 105 is initially in a CM_CONNECTED state (e.g. in which UE 105 has a signaling connection to AMF 154). The procedure shown in FIG. 9 may be used at stage 12 in FIG. 7 and/or at stage 6 in FIG. 8. The procedure shown in FIG. 9 includes the following stages.

At stage 1 in FIG. 9, the AMF 154 sends a request message such as a Location Reporting Control message (e.g. for an NGAP protocol) to the serving gNB 110-1 or serving ng-eNB 114 for UE 105 in NG-RAN 112. The message may contain a UE 105 identification, a Reporting Type, an optional Location Reporting Level (e.g. indicating an area of interest), a location Quality of Service (QoS) and optionally a maximum duration or maximum number of reports for triggered location. The Reporting Type can indicate a one-time location or a series of triggered locations based on criteria (also referred to as triggering events) such as a change of serving cell, a fixed periodic interval or entry into or exit from an area of interest. The supported triggering events may include location reporting for UE 105 following a change of serving cell or serving TA for UE 105 or following entry of UE 105 into, or exit of UE 105 out of, an area of interest. The supported triggering events may also include additional triggering events such as a fixed periodic event or a trigger event based on movement of the UE 105 by more than some threshold distance. The triggering events may be defined to align with triggering events used for a GMLC based location method (e.g. as used in stage 4 in FIG. 7) to enable a unified location service from an NEF 159.

At stage 2, depending on the location QoS requested in stage 1, the NG-RAN 112 (e.g. the serving gNB 110-1 or serving ng-eNB 114 for UE 105) may send a Location Measurement Request message (e.g. for a Radio Resource Control (RRC) protocol or an LPP protocol) to the UE 105 to request location measurements from the UE 105 (e.g. location measurements by UE 105 of signals transmitted by the serving gNB 110-1 or serving ng-eNB 114 for UE 105 and/or other gNBs 110 and ng-eNBs 114 in NG-RAN 112).

At stage 3, if stage 2 occurs, the UE 105 obtains and returns the requested location measurements (e.g. in a message for the RRC protocol or the LPP protocol).

At stage 4, using (i) any location measurements provided at stage 3, (ii) any recent location measurements previously received from the UE 105, (iii) any location measurements for the UE 105 obtained by the serving gNB 110-1 or serving ng-eNB 114 for UE 105, and/or (iv) any location measurements obtained for UE 105 by other gNBs 110 and ng-eNBs 114 in NG-RAN 112 and provided to the serving gNB 110-1 or serving ng-eNB 114, the serving gNB 110-1 or serving ng-eNB 114 for UE 105 determines the UE 105 location. Possible position methods that may be used by the serving gNB 110-1 or serving ng-eNB 114 at stage 4 to obtain the location of UE 105 include Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

At stage 5, the serving gNB 110-1 or serving ng-eNB 114 returns the UE location to the AMF 154 in a response message such as a Location Report message (e.g. for the NGAP protocol).

At stage 6, if triggered UE locations were requested at stage 1, the serving gNB 110-1 or serving ng-eNB 114 for UE 105 waits until a trigger event occurs and then proceeds to stage 7.

At stages 7-10, the serving gNB 110-1 or serving ng-eNB 114 for UE 105 repeats stages 2-5. Stages 6-10 are then repeated until a maximum number of reports or a maximum duration is attained or until stage 11 occurs.

At stage 11, for triggered location reporting, the AMF 154 may cancel the location reporting in the serving gNB 110-1 or serving ng-eNB 114 for UE 105—e.g. if no maximum duration or maximum number of reports was included at stage 1.

In a variant of the procedure described for FIG. 9, NG-RAN 112 may use a local LMF of LMC to obtain location measurements and a location estimate for UE 105. In this variant, any reference to serving gNB 110-1 or serving ng-eNB 114 for UE 105 in the description of stages 1-11 for FIG. 7 may be replaced by a reference to the local LMF or LMC (which may thus perform the actions previously described as performed by the serving gNB 110-1 or serving ng-eNB 114).

In one embodiment of the methods described herein, a GMLC and an NEF may be combined. For example, in FIGS. 1 and 3, GMLC 155 and NEF 159 may be combined. In addition or instead, HGMLC 155H and NEF 159 may be combined in FIG. 2 and/or FIG. 4. In this embodiment, stages 3, 5 and 6 may be omitted in FIG. 7.

In another embodiment of the methods described herein, a GMLC (e.g. GMLC 155 or 155H) instead of an NEF may determine whether to use a GMLC method or an AMF method to obtain a location for a UE (e.g. UE 105). In this embodiment, for example, the procedure shown in FIG. 7 may be used with some differences. For example, stages 1a and 1b in FIG. 7 may occur as described previously. Following stage 1a or stage 1b, NEF 159 may always perform stages 3-6 and may omit performing stage 2 and stages 7-14. Following stage 3, HGMLC 155H (instead of NEF 159) may perform the actions described for stage 2 in FIG. 7 to determine whether to use an AMF location method or a GMLC location method to obtain the location of UE 105. When HGMLC 155H determines to use a GMLC location method, stage 4 of FIG. 7 may be performed. When HGMLC 155H determines to use an AMF location method, stages 7-14 of FIG. 7 may be performed with HGMLC 155H performing the actions previously described for NEF 159 for these stages. HGMLC 155H may then return the UE 105 location(s) obtained using the AMF or GMLC location method to NEF 159 at stage 5 and optionally (e.g. in the case of periodic or triggered location) stage 6. NEF 159 may then perform stage 15a and optionally 16a or stage 15b and optionally 16b to return the UE 105 location(s) to AF 163 or NF 161, respectively.

In a further embodiment of the methods described here, a GMLC (e.g. GMLC 155 in FIGS. 1 and 3 or HGMLC 155H in FIGS. 2 and 4) may be combined with or replaced by a Secure User Plane Location (SUPL) Location Platform (SLP) as defined for the SUPL user plane location solution defined by the Open Mobile Alliance (OMA). In this embodiment, the GMLC location method determined by an NEF (e.g. as at stage 2 in FIG. 7) may correspond to the SUPL location method and the GMLC location method may comprise obtaining a location for a UE (e.g. as at stage 4 in FIG. 7) by obtaining location information (e.g. location measurements or a location estimate) from the UE 105 by the SLP using the OMA User Plane Location Protocol (ULP) defined by OMA. For example, in this embodiment, the SLP may be a Home SLP (H-SLP) in an HPLMN for the UE (e.g. an H-SLP in HPLMN 140-1).

Figure 10:
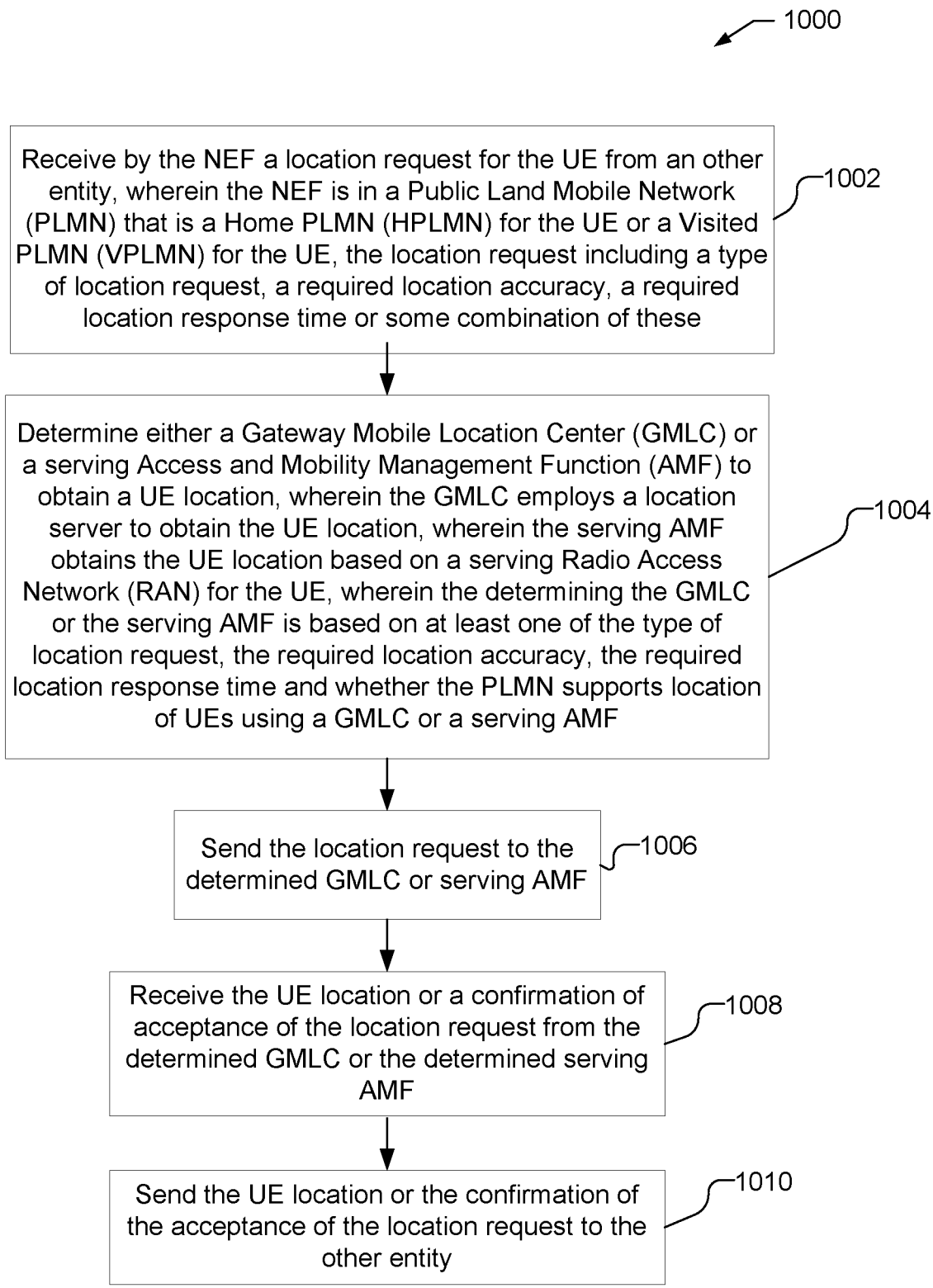
FIG. 10 shows a process flow illustrating a method for supporting location services for a UE performed by a Network Exposure Function (NEF).

FIG. 10 shows a process flow 1000 illustrating a method for supporting location services for a user equipment (UE), such as UE 105, performed by a Network Exposure Function (NEF), such as NEF 159. As illustrated, at block 1002, the NEF may receive a location request for a UE from another entity. The NEF may be in a Public Land Mobile Network (PLMN) that is a Home PLMN (HPLMN) for the UE (e.g. HPLMN 5GCN 140-1) or a Visited PLMN (VPLMN) for the UE (e.g. VPLMN 5GCN 150-1). The location request may include a type of location request, a required location accuracy, a required location response time or some combination of these. The other entity, for example, may be an external client, such as external client 130, an Application Function (AF) outside the PLMN, such as AF 163, or a Network Function (NF) inside the PLMN, such as NF 161. Block 1002 may correspond to stage 1a or stage 1b in FIG. 7.

At block 1004, the NEF may determine either a Gateway Mobile Location Center (e.g. GMLC 155, HGMLC 155H or VGMLC 155V), or a serving Access and Mobility Management Function (AMF), such as AMF 154, for the UE to obtain a UE location, where the GMLC employs a location server to obtain the UE location, and where the AMF obtains the UE location based on a serving Radio Access Network (RAN), e.g., RAN 112, for the UE. Determining the GMLC or the serving AMF at block 1004 may be based on at least one of the type of location request, the required location accuracy, the required location response time and whether the PLMN supports location of UEs using a GMLC or a serving AMF. Block 1004 may correspond to stage 2 and part of stage 3 in FIG. 7.

At block 1006, the NEF may send the location request to the determined GMLC (e.g. as at stage 3 in FIG. 7) or to the serving AMF (e.g. as at stage 9 in FIG. 7). Sending the location request to the serving AMF, for example may comprise invoking an AMF Event Exposure Subscribe service operation towards the serving AMF to request information on the location of the UE. In some implementations where the serving AMF is determined at block 1004, the NEF may either query a Unified Data Management (UDM) in the HPLMN for the UE (e.g. UDM 156) for the serving AMF address (e.g. as at stage 8 in FIG. 7) or send the AMF Event Exposure Subscribe service operation towards the serving AMF via the UDM (e.g. UDM 156) for the UE, e.g. as described previously herein for FIG. 8.

The location server for block 1004, for example, may be a Location Management Function (LMF), such as LMF 152, where (e.g. following block 1006) the determined GMLC forwards the location request to the LMF directly or via the serving AMF for the UE, and where the LMF obtains the UE location by obtaining location measurements or a location estimate from at least one of the UE and a serving RAN for the UE (e.g. as described for stage 4 for FIG. 7). For example, the LMF may obtain the location measurements or the location estimate from the UE using at least one of a Long Term Evolution (LTE) Positioning Protocol (LPP) or a New Radio Positioning Protocol (NPP), and/or the LMF may obtain the location measurements or the location estimate from the serving RAN using a New Radio (NR) Positioning Protocol A (NRPPa). In some embodiments, the location server, for example, may be a Secure User Plane Location (SUPL) Location Platform (SLP), where the GMLC comprises the location server, and where the location server obtains the UE location by obtaining location measurements or a location estimate from the UE using a SUPL User Plane Location Protocol (ULP) as defined by the Open Mobile Alliance (OMA).

When the NEF determines the serving AMF at block 1004, the serving AMF may obtain the UE location from the serving RAN (e.g. NG-RAN 112). In one implementation, the serving RAN may obtain the UE location based on a current or previous serving cell or a tracking area (TA) for the UE, e.g. as described for stage 12 in FIG. 7. In another implementation, and as described for stages 1-5 in FIG. 9, the serving RAN (e.g. NG-RAN 112) may obtain the UE location based on a serving base station for the UE in the serving RAN, where the serving base station obtains the UE location by obtaining location measurements comprising: (i) location measurements of signals transmitted by the UE; (ii) location measurements obtained by other base stations in the serving RAN of signals transmitted by the UE; (iii) location measurements obtained by the UE of signals transmitted by the serving base station; (iv) location measurements obtained by the UE of signals transmitted by other base stations in the serving RAN; or (v) some combination thereof. The serving base station, for example, may be an NR Node B (gNB) or an NG evolved NodeB (ng-eNB), such as gNB 110-1 or ng-eNB 114. The AMF may use a Next Generation Application Protocol (NGAP) to obtain the UE location from the serving RAN, e.g. as described for stages 1 and 5 in FIG. 9. Additionally, and as described for stage 4 in FIG. 9, the serving base station may determine the UE location from the obtained location measurements using at least one of Observed Time Difference Of Arrival (OT-DOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

At block 1008 in process flow 1000, the NEF may receive the UE location or a confirmation of acceptance of the location request from the determined GMLC or the determined serving AMF and may send the UE location or the confirmation of the acceptance of the location request to the other entity at block 1010. For example, block 1008 may correspond to stage 5 or stage 13 in FIG. 7 and block 1010 may correspond to stage 15a or stage 15b in FIG. 7.

In one implementation, the type of location request may be a request for periodic or triggered locations of the UE, and the process may further include the NEF receiving a plurality of additional location reports from the determined GMLC (e.g. as at stage 6 in FIG. 7) or from the determined serving AMF (e.g. as at stage 14 in FIG. 7), where each location report in the plurality of additional location reports comprises an indication of a trigger event, a location for the UE or both. This implementation may further comprise the NEF sending, for each location report received, the trigger event, the location or both to the other entity, e.g. as at stage 16a or stage 16b in FIG. 7.

Figure 11:
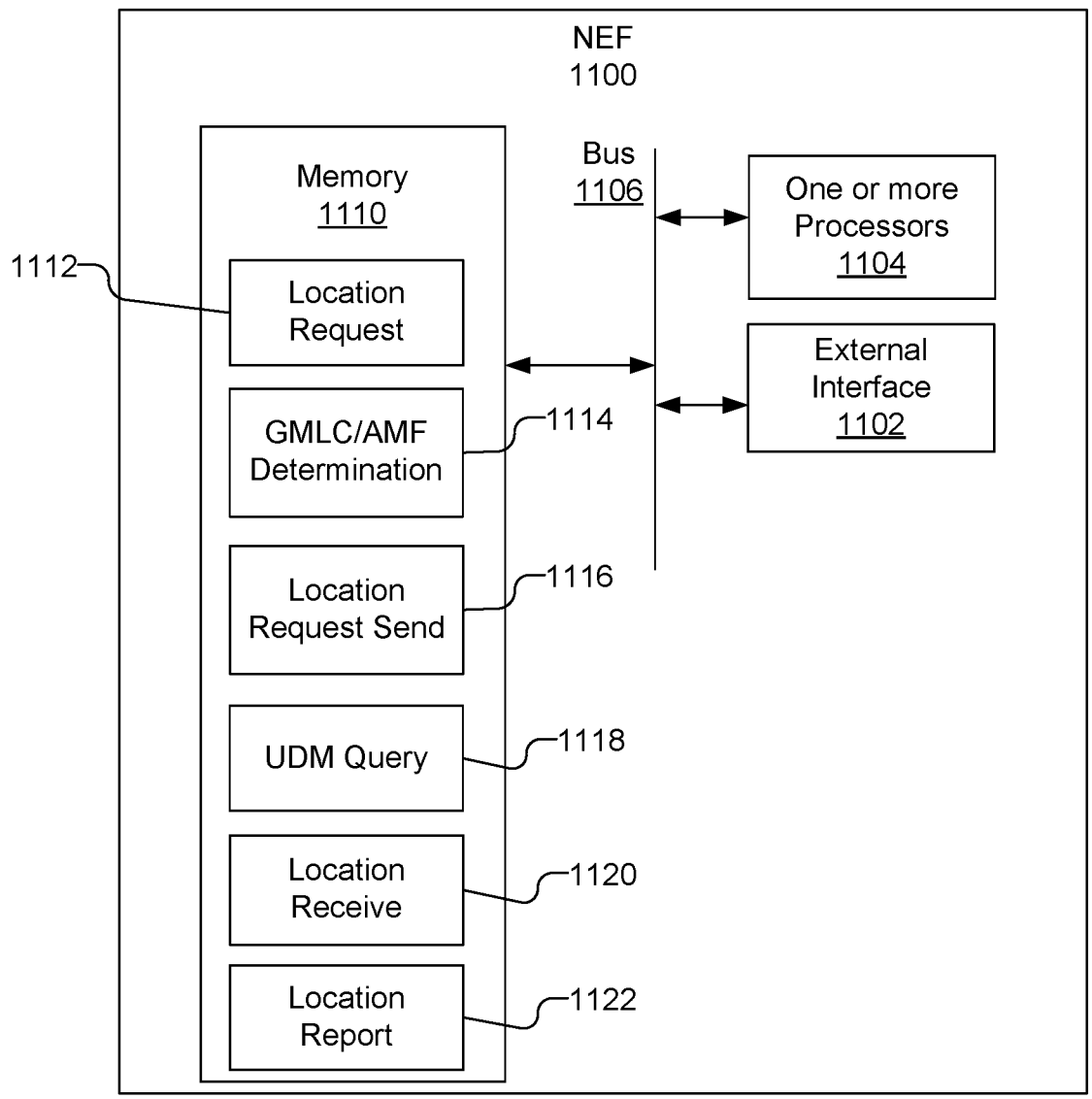
FIG. 11 is a diagram illustrating an example of a hardware implementation of an NEF capable of supporting location services for a UE.

FIG. 11 is a diagram illustrating an example of a hardware implementation of an NEF 1100, such as NEF 159 shown in FIGS. 1-4. The NEF 1100 may be, e.g., part of a wireless network such as a 5G Core network (5GCN). The NEF 1100 includes, e.g., hardware components such as an external interface 1102, which may be a wired or wireless interface capable of connecting to an external client, such as external client 130, an AF outside the wireless network, such as AF 163, an NF inside the wireless network, such as NF 161, a GMLC, such as GMLC 155, an AMF, such as AMF 154, and a UDM, such as UDM 156. The NEF 1100 includes one or more processors 1104 and memory 1110, which may be coupled together with bus 1106. The memory 1110 may contain executable code or software instructions that when executed by the one or more processors 1104 cause the one or more processors 1104 to operate as a special purpose computer programmed to perform the procedures and techniques disclosed herein (e.g. such as the process flow 1000).

As illustrated in FIG. 11, the memory 1110 includes one or more components or modules that when implemented by the one or more processors 1104 implements the methodologies described herein. While the components or modules are illustrated as software in memory 1110 that is executable by the one or more processors 1104, it should be understood that the components or modules may be dedicated hardware or firmware either in the processors 1104 or off processor. As illustrated, the memory 1110 may include a location request unit 1112 that enables the one or more processors 1104 to receive via the external interface 1102 and process a location service request transmitted by an entity inside or outside a PLMN, such as an external client, an AF outside the PLMN, or an NF inside the PLMN. The location request may include a type of location request, a required location accuracy, a required location response time or some combination thereof. The type of location request, for example, may be a request for periodic or triggered locations of the UE.

The memory 1110 may include a GMLC/AMF determination unit 1114 that cause the one or more processors 1104 to determine whether to use a GMLC or a serving AMF for the UE to obtain the UE location based on at least one of the type of location request, the required location accuracy, the required location response time and whether the PLMN supports location of UEs using a GMLC or a serving AMF.

The location request send unit 1116 may enable the one or more processors 1104 to send the location request to the GMLC or serving AMF via the external interface 1102, as determined using the GMLC/AMF determination unit 1114. For example, the location request may be sent to the serving AMF by invoking an AMF Event Exposure Subscribe service operation towards the serving AMF to request information on the location of the UE. In some implementations, a UDM Query unit 1118 may enable the one or more processors 1104 to query a UDM in the HPLMN for the UE for the serving AMF address before sending the location request to the serving AMF or the location request send unit 1116 may cause the one or more processors 1104 to send the AMF Event Exposure Subscribe service operation towards the serving AMF via the UDM for the UE.

A location receive unit 1120 may enable the one or more processors 1104 to receive via the external interface 1102 the UE location or a confirmation of acceptance of the location request from the GMLC or serving AMF. A location report unit 1122 may enable the one or more processors 1104 to send via the external interface 1102 the UE location or the confirmation of the acceptance of the location request to the requesting entity. In some implementations where the type of location request is a request for periodic or triggered locations of the UE, the location receive unit 1120 and location report unit 1122 may cause the one or more processors 1104 to receive from the determined GMLC or serving AMF and send to the requesting entity a plurality of additional location reports, where each location report in the plurality of additional location reports may include an indication of a trigger event, a location for the UE or both.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1110) and executed by one or more processor units (e.g. processors 1104), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1110, and are configured to cause the one or more processors (e.g. processors 1104) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an NEF (e.g. an NEF 1100) capable of supporting location services for a user equipment (UE) may include a means for receiving by the NEF a location request for the UE from an other entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, which may be, e.g., the external interface 1102 and one or more processors 1104 with dedicated hardware or implementing executable code or software instructions in memory 1110 such as the location request unit 1112. A means for determining whether to use a Gateway Mobile Location Center (GMLC) or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the determining the GMLC or the serving AMF is based on at least one of the type of location request, the required location accuracy, the required location response time and whether the PLMN supports location of UEs using a GMLC or a serving AMF, may be, e.g., the one or more processors 1104 with dedicated hardware or implementing executable code or software instructions in memory 1110 such as the GMLC/AMF determination unit 1114. A means for sending the location request to the determined GMLC or the determined serving AMF may be, e.g., the external interface 1102 and one or more processors 1104 with dedicated hardware or implementing executable code or software instructions in memory 1110 such as the location request send unit 1116 and the UDM query unit 1118. A means for receiving the UE location or a confirmation of acceptance of the location request from the determined GMLC or the determined serving AMF may be, e.g., the external interface 1102 and one or more processors 1104 with dedicated hardware or implementing executable code or software instructions in memory 1110 such as the location receive unit 1120. A means for sending the UE location or the confirmation of the acceptance of the location request to the other entity may be, e.g., the external interface 1102 and one or more processors 1104 with dedicated hardware or implementing executable code or software instructions in memory 1110 such as the location report unit 1122.

The NEF may further include a means for querying a Unified Data Management (UDM) in the HPLMN for the UE for the serving AMF address, which may be, e.g., the external interface 1102 and one or more processors 1104 with dedicated hardware or implementing executable code or software instructions in memory 1110 such as the UDM query unit 1118. The NEF may further include a means for sending the AMF Event Exposure Subscribe service operation towards the serving AMF via the UDM for the UE, which may be, e.g., the external interface 1102 and one or more processors 1104 with dedicated hardware or implementing executable code or software instructions in memory 1110 such as the location request send unit 1116.

The NEF may further include, e.g., for when the type of location request is a request for periodic or triggered locations of the UE, a means for receiving a plurality of additional location reports from the determined GMLC or serving AMF, each location report in the plurality of additional location reports comprising an indication of a trigger event, a location for the UE or both, which may be, e.g., the external interface 1102 and one or more processors 1104 with dedicated hardware or implementing executable code or software instructions in memory 1110 such as the location receive unit 1120. A means for sending the trigger event, the location or both in each location report to the other entity may be, e.g., the external interface 1102 and one or more processors 1104 with dedicated hardware or implementing executable code or software instructions in memory 1110 such as the location report unit 1122.

Figure 12:
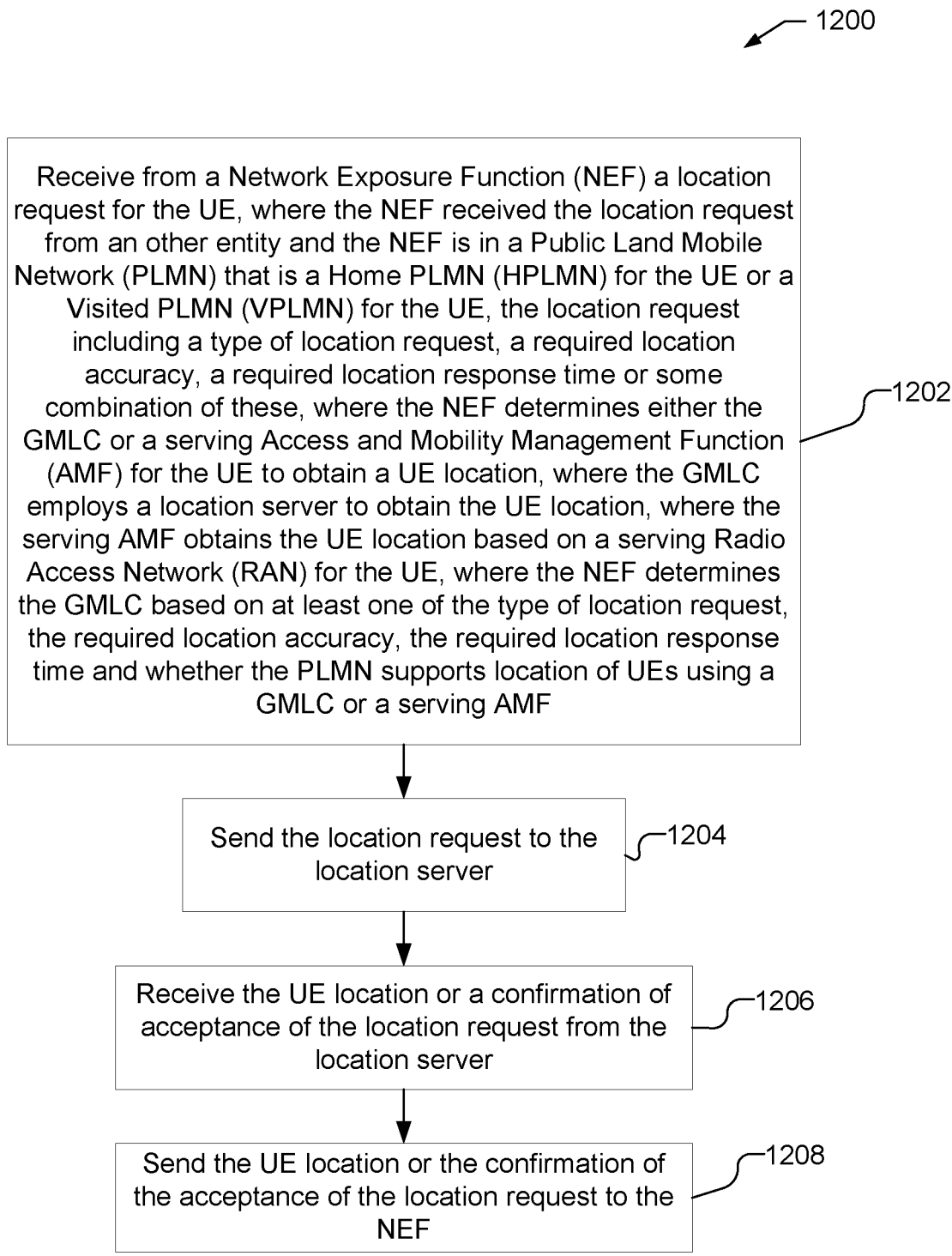
FIG. 12 shows a process flow illustrating a method for supporting location services for a UE performed by a Gateway Mobile Location Center (GMLC).

FIG. 12 shows a process flow 1200 illustrating a method for supporting location services for a user equipment (UE), such as UE 105, performed by a Gateway Mobile Location Center (GMLC), such as GMLC 155, HGMLC 155H or VGMLC 155V. As illustrated, at block 1202, the GMLC may receive from a Network Exposure Function (NEF), such as NEF 159, a location request for the UE, where the NEF receives the location request from an other entity and the NEF is in a Public Land Mobile Network (PLMN) that is a Home PLMN (HPLMN) for the UE (e.g. HPLMN 5GCN 140-1) or a Visited PLMN (VPLMN) for the UE (e.g. VPLMN 5GCN 150-1). The location request may include a type of location request, a required location accuracy, a required location response time or some combination of these. The NEF may determine either the GMLC or a serving Access and Mobility Management Function (AMF), such as AMF 154, for the UE to obtain a UE location, where the GMLC employs a location server to obtain the UE location, and where the serving AMF obtains the UE location based on a serving Radio Access Network (RAN), e.g., NG-RAN 112, for the UE. The NEF may determine the GMLC based on at least one of the type of location request, the required location accuracy, the required location response time and whether the PLMN supports location of UEs using a GMLC or a serving AMF. The other entity, for example, may be an external client, such as external client 130, an Application Function (AF) outside the PLMN, such as AF 163, or a Network Function (NF) inside the PLMN, such as NF 161. Block 1202 may correspond to stages 1-3 in FIG. 7.

At block 1204, the GMLC may send the location request to the location server. The location server, for example, may be a Location Management Function (LMF), such as LMF 152, where the GMLC sends the location request to the LMF either directly or via a serving AMF for the UE (e.g. AMF 154). Block 1204 may correspond to part of stage 4 in FIG. 7.

At block 1206, the GMLC receives the UE location or a confirmation of acceptance of the location request from the location server. For example, the LMF may obtain the UE location by obtaining location measurements or a location estimate from at least one of the UE and the serving RAN for the UE (e.g. as described for stage 4 in FIG. 7). For example, the LMF may obtain the location measurements or the location estimate from the UE using at least one of a Long Term Evolution (LTE) Positioning Protocol (LPP) or a New Radio Positioning Protocol (NPP), and/or the LMF may obtain the location measurements or the location estimate from the serving RAN using a New Radio (NR) Positioning Protocol A (NRPPa). In some embodiments, the location server, for example, may be a Secure User Plane Location (SUPL) Location Platform (SLP), where the GMLC comprises the location server, and where the location server obtains the UE location by obtaining location measurements or a location estimate from the UE using a SUPL User Plane Location Protocol (ULP) as defined by the Open Mobile Alliance (OMA). Block 1206 may correspond to stage 4 in FIG. 7.

At block 1208, the GMLC may send the UE location or the confirmation of the acceptance of the location request to the NEF. For example, block 1208 may correspond to stage 5 in FIG. 7.

In one implementation, the type of location request may be a request for periodic or triggered location of the UE, and the process may further include the GMLC receiving a plurality of additional location reports from the location server, e.g. as at stage 4 in FIG. 7, where each location report in the plurality of additional location reports comprises an indication of a trigger event, a location for the UE or both. This implementation may further comprise the GMLC sending, for each location report received, the trigger event, the location or both to the NEF, e.g. as at stage 6 in FIG. 7.

Figure 13:
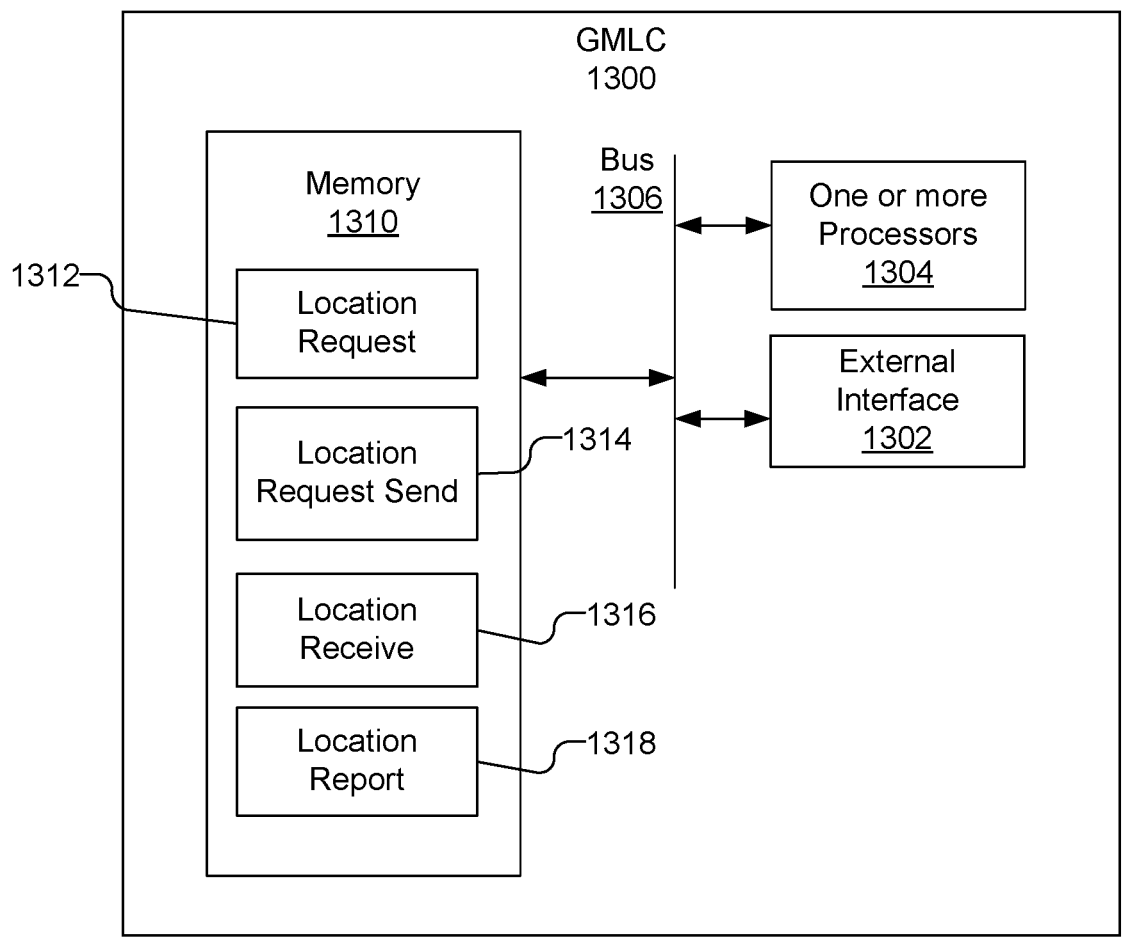
FIG. 13 is a diagram illustrating an example of a hardware implementation of a GMLC capable of supporting location services for a UE.

FIG. 13 is a diagram illustrating an example of a hardware implementation of a GMLC 1300, such as GMLC 155, HGMLC 155H or VGMLC 155V shown in FIGS. 1-4. The GMLC 1300 may be, e.g., part of a wireless network such as a 5G Core network (5GCN). The GMLC 1300 includes, e.g., hardware components such as an external interface 1302, which may be a wired or wireless interface capable of connecting to an NEF, such as NEF 159, an external client, such as external client 130, an AF outside the wireless network, such as AF 163, an AMF, such as AMF 154, and a LMF, such as LMF 152. The GMLC 1300 includes one or more processors 1304 and memory 1310, which may be coupled together with bus 1306. The memory 1310 may contain executable code or software instructions that when executed by the one or more processors 1304 cause the one or more processors 1304 to operate as a special purpose computer programmed to perform the procedures and techniques disclosed herein (e.g. such as the process flow 1200).

As illustrated in FIG. 13, the memory 1310 includes one or more components or modules that when implemented by the one or more processors 1304 implements the methodologies described herein. While the components or modules are illustrated as software in memory 1310 that is executable by the one or more processors 1304, it should be understood that the components or modules may be dedicated hardware or firmware either in the processors 1304 or off processor. As illustrated, the memory 1310 may include a location request unit 1312 that enables the one or more processors 1304 to receive via the external interface 1302 and process a location service request transmitted by an NEF (e.g. NEF 159). The location request may include a type of location request, a required location accuracy, a required location response time or some combination thereof. The type of location request, for example, may be a request for periodic or triggered locations of the UE.

The location request send unit 1314 may enable the one or more processors 1304 to send the location request to a location server via the external interface 1302. For example, where the location server is an LMF, the location request may be sent to the LMF directly or via a serving AMF for the UE.

A location receive unit 1316 may enable the one or more processors 1304 to receive via the external interface 1302 the UE location or a confirmation of acceptance of the location request from the location server. A location report unit 1318 may enable the one or more processors 1304 to send via the external interface 1302 the UE location or the confirmation of the acceptance of the location request to the NEF. In some implementations where the type of location request is a request for periodic or triggered location of the UE, the location receive unit 1316 and location report unit 1318 may cause the one or more processors 1304 to receive from the determined GMLC or serving AMF and send to the requesting entity a plurality of additional location reports, where each location report in the plurality of additional location reports may include an indication of a trigger event, a location for the UE or both.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1310) and executed by one or more processor units (e.g. processors 1304), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1310, and are configured to cause the one or more processors (e.g. processors 1304) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a GMLC (e.g. an GMLC 1300) capable of supporting location services for a user equipment (UE) may include a means for receiving from a Network Exposure Function (NEF) a location request for a UE, where the NEF receives the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, where the NEF determines either the GMLC or a serving Access and Mobility Management Function (AMF) for the UE to obtain a UE location, where the GMLC employs a location server to obtain the UE location, where the serving AMF obtains the UE location based on a serving Radio Access Network (RAN) for the UE, where the NEF determines the GMLC based on at least one of the type of location request, the required location accuracy, the required location response time and whether the PLMN supports location of UEs using a GMLC or a serving AMF; which may be, e.g., the external interface 1302 and one or more processors 1304 with dedicated hardware or implementing executable code or software instructions in memory 1310 such as the location request unit 1312. A means for sending the location request to the location server may be, e.g., the external interface 1302 and one or more processors 1304 with dedicated hardware or implementing executable code or software instructions in memory 1310 such as the location request send unit 1314. A means for receiving the UE location or a confirmation of acceptance of the location request from the location server may be, e.g., the external interface 1302 and one or more processors 1304 with dedicated hardware or implementing executable code or software instructions in memory 1310 such as the location receive unit 1316. A means for sending the UE location or the confirmation of the acceptance of the location request to the NEF may be, e.g., the external interface 1302 and one or more processors 1304 with dedicated hardware or implementing executable code or software instructions in memory 1310 such as the location report unit 1318.

The GMLC may further include, e.g., for when the type of location request is a request for periodic or triggered location of the UE, a means for receiving a plurality of additional location reports from the location server, each location report in the plurality of location reports comprising an indication of a trigger event, a location for the UE or both, which may be, e.g., the external interface 1302 and one or more processors 1304 with dedicated hardware or implementing executable code or software instructions in memory 1310 such as the location receive unit 1316. A means for sending, for each location report, the trigger event, the location or both to the NEF may be, e.g., the external interface 1302 and one or more processors 1304 with dedicated hardware or implementing executable code or software instructions in memory 1310 such as the location report unit 1318.

Figure 14:
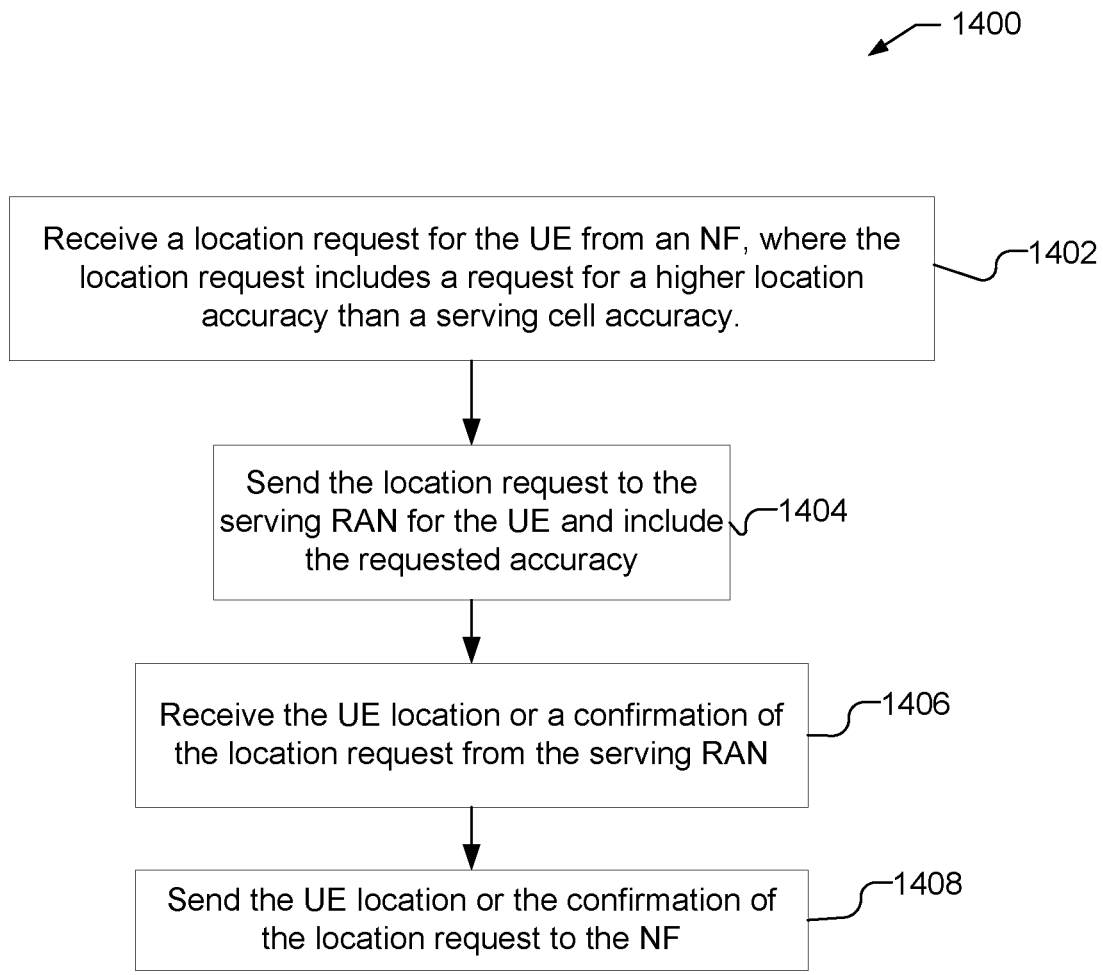
FIG. 14 shows a process flow illustrating a method for supporting location services for a UE performed by an Access and Mobility Management Function (AMF).

FIG. 14 shows a process flow 1400 illustrating a method for supporting location services for a user equipment (UE), such as UE 105, performed by a serving Access and Mobility Management Function (AMF) for the UE, such as AMF 154. As illustrated, at block 1402, the serving AMF may receive from a Network Function (NF) such as a Network Exposure Function (NEF), such as NEF 159, a location request for the UE, where the location request includes a request for a higher location accuracy than that possible based on a serving cell for the UE.

In one aspect, the NF may be an NEF (e.g. NEF 159), where the NEF receives the location request from an other entity and where the NEF is in a Public Land Mobile Network (PLMN) that is a Home PLMN (HPLMN) for the UE (e.g. HPLMN 5GCN 140-1) or a Visited PLMN (VPLMN) for the UE (e.g. VPLMN 5GCN 150-1), where the location request includes a type of location request, a required location accuracy, a required location response time or some combination of these. The NEF may determine either a Gateway Mobile Location Center (GMLC), such as GMLC 155, HGMLC 155H or VGMLC 155V, or the serving AMF for the UE to obtain a UE location, where the GMLC employs a location server to obtain the UE location, where the serving AMF obtains the UE location based on a serving Radio Access Network (RAN), such as RAN 112, for the UE, and where the NEF determines the serving AMF based on at least one of the type of location request, the required location accuracy, the required location response time and whether the PLMN supports location of UEs using a GMLC or a serving AMF. In this aspect, the other entity, for example, may be an external client, such as external client 130, an Application Function (AF) outside the PLMN, such as AF 163, or another Network Function (NF) inside the PLMN, such as NF 161.

Receiving the location request from the NF, for example may comprise receiving an AMF Event Exposure Subscribe service operation invoked by the NF towards the serving AMF to request information on the location of the UE. In some implementations, the serving AMF address is obtained by the NF querying a Unified Data Management (UDM), e.g., UDM 156, in the HPLMN for the UE (e.g. as at stage 8 in FIG. 7). In another implementation, the AMF Event Exposure Subscribe service operation invoked by the NF towards the serving AMF is received via the UDM for the UE, e.g. as described for FIG. 8. Block 1402 may correspond to stage 9 in FIG. 7 or to stage 2 in FIG. 8 for an NF which is an NEF.

At block 1404, the serving AMF may send the location request to the serving RAN for the UE and may include the requested accuracy or requested location QoS, e.g. as at stage 1 in FIG. 9. At block 1406, the serving AMF may receive the UE location or a confirmation of the location request from the serving RAN. The serving RAN (e.g. NG-RAN 112), for example, may obtain the UE location based on a serving base station for the UE in the serving RAN, where the serving base station obtains the UE location by obtaining location measurements comprising: (i) location measurements of signals transmitted by the UE; (ii) location measurements obtained by other base stations in the serving RAN of signals transmitted by the UE; (iii) location measurements obtained by the UE of signals transmitted by the serving base station; (iv) location measurements obtained by the UE of signals transmitted by other base stations in the serving RAN; or (v) some combination thereof. The serving base station, for example, may be a New Radio (NR) Node B (gNB) or a Next Generation (NG) evolved NodeB (ng-eNB), such as gNB 110-1 or ng-eNB 114. The serving AMF may use a Next Generation Application Protocol (NGAP) to obtain the UE location from the serving RAN, e.g. as described for stages 1 and 5 in FIG. 9. Additionally, and as described for stage 4 in FIG. 9, the serving base station may determine the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK). Blocks 1404 and 1406 may correspond to stage 12 in FIG. 7 and/or to stages 1 and 5 in FIG. 9.

At block 1408, the serving AMF may send the UE location or the confirmation of the location request to the NF. For example, block 1408 may correspond to stage 13 in FIG. 7 for an NF which is an NEF.

In one implementation, the type of location request may be a request for periodic or triggered location of the UE, and the process may further include the serving AMF receiving a plurality of additional location reports from the serving RAN, each location report in the plurality of additional location reports comprising an indication of a trigger event, a location for the UE or both, e.g. as at stage 10 in FIG. 9, where each location report in the plurality of additional location reports comprises an indication of a trigger event, a location for the UE or both. This implementation may further comprise the serving AMF sending, for each location report received, the trigger event, the location or both to the NF, e.g. as at stage 14 in FIG. 7 for an NF which is an NEF.

Figure 15:
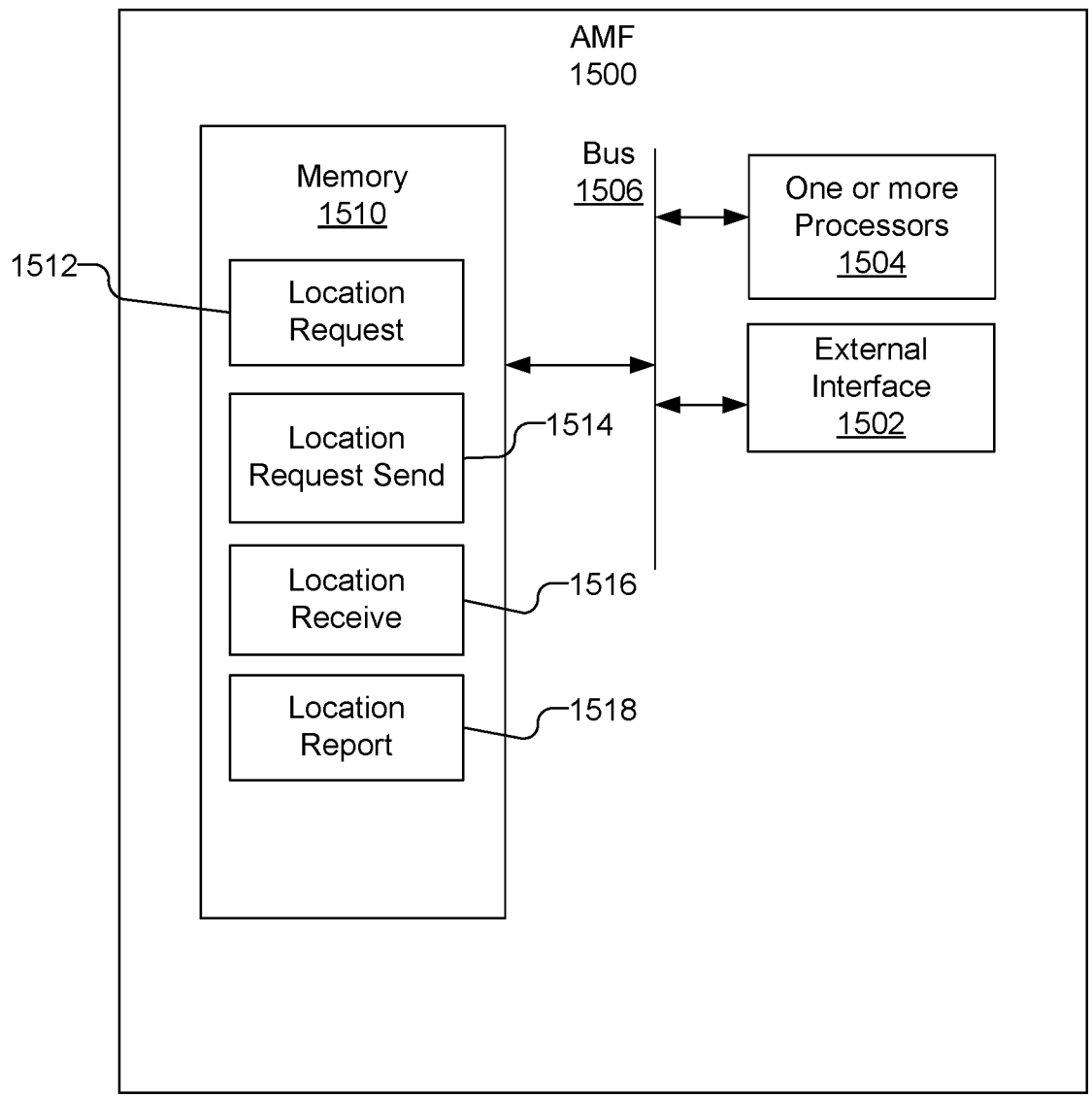
FIG. 15 is a diagram illustrating an example of a hardware implementation of an AMF capable of supporting location services for a UE.

FIG. 15 is a diagram illustrating an example of a hardware implementation of an AMF 1500, such as AMF 154 shown in FIGS. 1-4. The AMF 1500 may be, e.g., part of a wireless network such as a 5G Core network (5GCN). The AMF 1500 includes, e.g., hardware components such as an external interface 1502, which may be a wired or wireless interface capable of connecting to an NEF, such as NEF 159, a GMLC, such as GMLC 155, HGMLC 155H or VGMLC 155V, a LMF, such as LMF 152, a UDM, such as UDM 156, and a RAN, such as RAN 112. The AMF 1500 includes one or more processors 1504 and memory 1510, which may be coupled together with bus 1506. The memory 1510 may contain executable code or software instructions that when executed by the one or more processors 1504 cause the one or more processors 1504 to operate as a special purpose computer programmed to perform the procedures and techniques disclosed herein (e.g. such as the process flow 1400).

As illustrated in FIG. 15, the memory 1510 includes one or more components or modules that when implemented by the one or more processors 1504 implements the methodologies described herein. While the components or modules are illustrated as software in memory 1510 that is executable by the one or more processors 1504, it should be understood that the components or modules may be dedicated hardware or firmware either in the processors 1504 or off processor. As illustrated, the memory 1510 may include a location request unit 1512 that enables the one or more processors 1504 to receive via the external interface 1502 and process a location service request transmitted by an NEF. The location request may include a type of location request, a required location accuracy, a required location response time or some combination thereof. The location request from the NEF may be an AMF Event Exposure Subscribe service operation invoked by the NEF towards the serving AMF to request information on the location of the UE. The type of location request, for example, may be a request for periodic or triggered location of the UE.

The location request send unit 1514 may enable the one or more processors 1504 to send the location request to a serving RAN via the external interface 1502. A location receive unit 1516 may enable the one or more processors 1504 to receive via the external interface 1502 the UE location or a confirmation of the location request from the serving RAN. A location report unit 1518 may enable the one or more processors 1504 to send via the external interface 1502 the UE location or the confirmation of the location request to the NEF. For example, a Next Generation Application Protocol (NGAP) may be used to obtain the UE location from the serving RAN.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1510) and executed by one or more processor units (e.g. processors 1504), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1510, and are configured to cause the one or more processors (e.g. processors 1504) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an AMF (e.g. an AMF 1500) capable of supporting location services for a user equipment (UE) may include a means for receiving from a Network Exposure Function (NEF) a location request for the UE, wherein the NEF receives the location request from an other entity and wherein the NEF is in a Public Land Mobile Network (PLMN) that is a Home PLMN (HPLMN) for the UE (e.g. HPLMN 5GCN 140-1) or a Visited PLMN (VPLMN) for the UE (e.g. VPLMN 5GCN 150-1), the location request including a type of location request, a required location accuracy, a required location response time or some combination of these, where the NEF determines either a Gateway Mobile Location Center (GMLC) or the serving AMF for the UE to obtain a UE location, where the GMLC employs a location server to obtain the UE location, where the serving AMF obtains the UE location based on a serving Radio Access Network (RAN) for the UE, where the NEF determines the serving AMF based on at least one of the type of location request, the required location accuracy, the required location response time and whether the PLMN supports location of UEs using a GMLC or a serving AMF, which may be, e.g., the external interface 1502 and one or more processors 1504 with dedicated hardware or implementing executable code or software instructions in memory 1510 such as the location request unit 1512. A means for sending the location request to the serving RAN for the UE may be, e.g., the external interface 1502 and one or more processors 1504 with dedicated hardware or implementing executable code or software instructions in memory 1510 such as the location request send unit 1514. A means for receiving the UE location or a confirmation of the location request from the serving RAN may be, e.g., the external interface 1502 and one or more processors 1504 with dedicated hardware or implementing executable code or software instructions in memory 1510 such as the location receive unit 1516. A means for sending the UE location or the confirmation of the location request to the NEF may be, e.g., the external interface 1502 and one or more processors 1504 with dedicated hardware or implementing executable code or software instructions in memory 1510 such as the location report unit 1518.

In one implementation, the means for receiving the location request from the NEF may comprise a means for receiving an AMF Event Exposure Subscribe service operation invoked by the NEF towards the serving AMF to request information on the location of the UE, which may be, e.g., the external interface 1502 and one or more processors 1504 with dedicated hardware or implementing executable code or software instructions in memory 1510 such as the location request unit 1512.

The AMF may further include, e.g., for when the type of location request is a request for periodic or triggered location of the UE, a means for receiving a plurality of additional location reports from the serving RAN, each location report in the plurality of additional location reports comprising an indication of a trigger event, a location for the UE or both, which may be, e.g., the external interface 1502 and one or more processors 1504 with dedicated hardware or implementing executable code or software instructions in memory 1510 such as the location receive unit 1516. A means for sending, for each location report, the trigger event, the location or both to the NEF may be, e.g., the external interface 1502 and one or more processors 1504 with dedicated hardware or implementing executable code or software instructions in memory 1310 such as the location report unit 1518.

Figure 16:
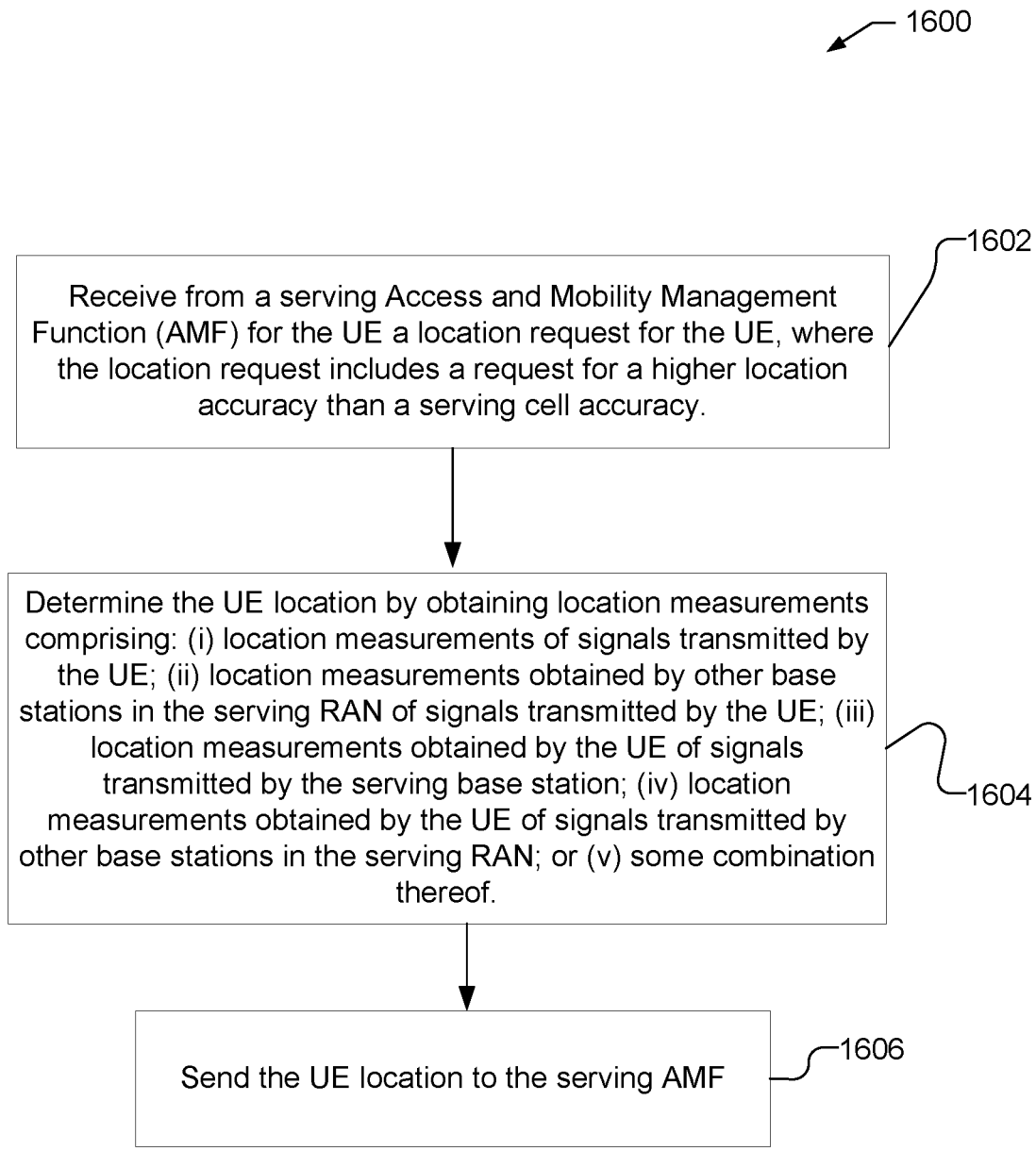
FIG. 16 shows a process flow illustrating a method for supporting location services for a UE performed by a base station.

FIG. 16 shows a process flow 1600 illustrating a method for supporting location services for a user equipment (UE), such as UE 105, performed by a serving base station, e.g., such as gNB 110-1 or ng-eNB 114, for the UE, the serving base station being in a serving Radio Access Network (RAN), such as NG-RAN 112, for the UE. As illustrated, at block 1602, the serving base station receives from a serving Access and Mobility Management Function (AMF), such as AMF 154, for the UE a location request for the UE, where the location request includes a request for a higher location accuracy than that possible based on a serving cell accuracy. Block 1602 may correspond to stage 1 in FIG. 9.

In one aspect, the serving AMF may receive the location request from a Network Exposure Function (NEF), such as NEF 159, where the NEF receives the location request from an other entity, and the NEF is in a Public Land Mobile Network (PLMN) that is a Home PLMN (HPLMN) for the UE (e.g. HPLMN 5GCN 140-1) or a Visited PLMN (VPLMN) for the UE (e.g. VPLMN 5GCN 150-1). The location request received by the NEF may include a type of location request, a required location accuracy, a required location response time or some combination of these. The NEF may determine either a Gateway Mobile Location Center (GMLC), such as GMLC 155, HGMLC 155H or VGMLC 155V, or the serving AMF for the UE to obtain a UE location, where the GMLC employs a location server to obtain the UE location, and where the serving AMF obtains the UE location based on the serving RAN for the UE. The NEF may determine the serving AMF for the UE based on at least one of the type of location request, the required location accuracy, the required location response time and whether the PLMN supports location of UEs using a GMLC or a serving AMF. In this aspect, the other entity, for example, may be an external client, such as external client 130, an Application Function (AF) outside the PLMN, such as AF 163, or a Network Function (NF) inside the PLMN, such as NF 161.

At block 1604, the serving base station may determine the UE location (e.g. as described for stages 2-4 in FIG. 9) by obtaining location measurements comprising: (i) location measurements of signals transmitted by the UE; (ii) location measurements obtained by other base stations in the serving RAN of signals transmitted by the UE; (iii) location measurements obtained by the UE of signals transmitted by the serving base station; (iv) location measurements obtained by the UE of signals transmitted by other base stations in the serving RAN; or (v) some combination thereof. For example, the serving base station may obtain the measurements for (i), (ii), (iii), (iv) or (v) and then compute the UE location based on the measurements as at stage 4 in FIG. 9. In an aspect, the serving base station may obtain the measurements for (iii) and/or (iv) using an RRC protocol.

At block 1606, the serving base station may send the UE location to the serving AMF.

The serving base station may use a Next Generation Application Protocol (NGAP) to receive the location request at block 1602 and provide the UE location to the serving AMF at block 1606, e.g. as described for stages 1 and 5 in FIG. 9. Additionally, and as described for stage 4 in FIG. 9, the serving base station may determine the UE location from the obtained location measurements at block 1604 using at least one of Observed Time Difference Of Arrival (OT-DOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

In one implementation, the type of location request may be a request for periodic or triggered location of the UE, and the process may further include the serving base station detecting a plurality of trigger events and for each trigger event, determining a UE location and sending a location report to the serving AMF comprising an indication of the trigger event, the determined location for the UE or both, e.g. as described for stages 6-10 in FIG. 9.

Figure 17:
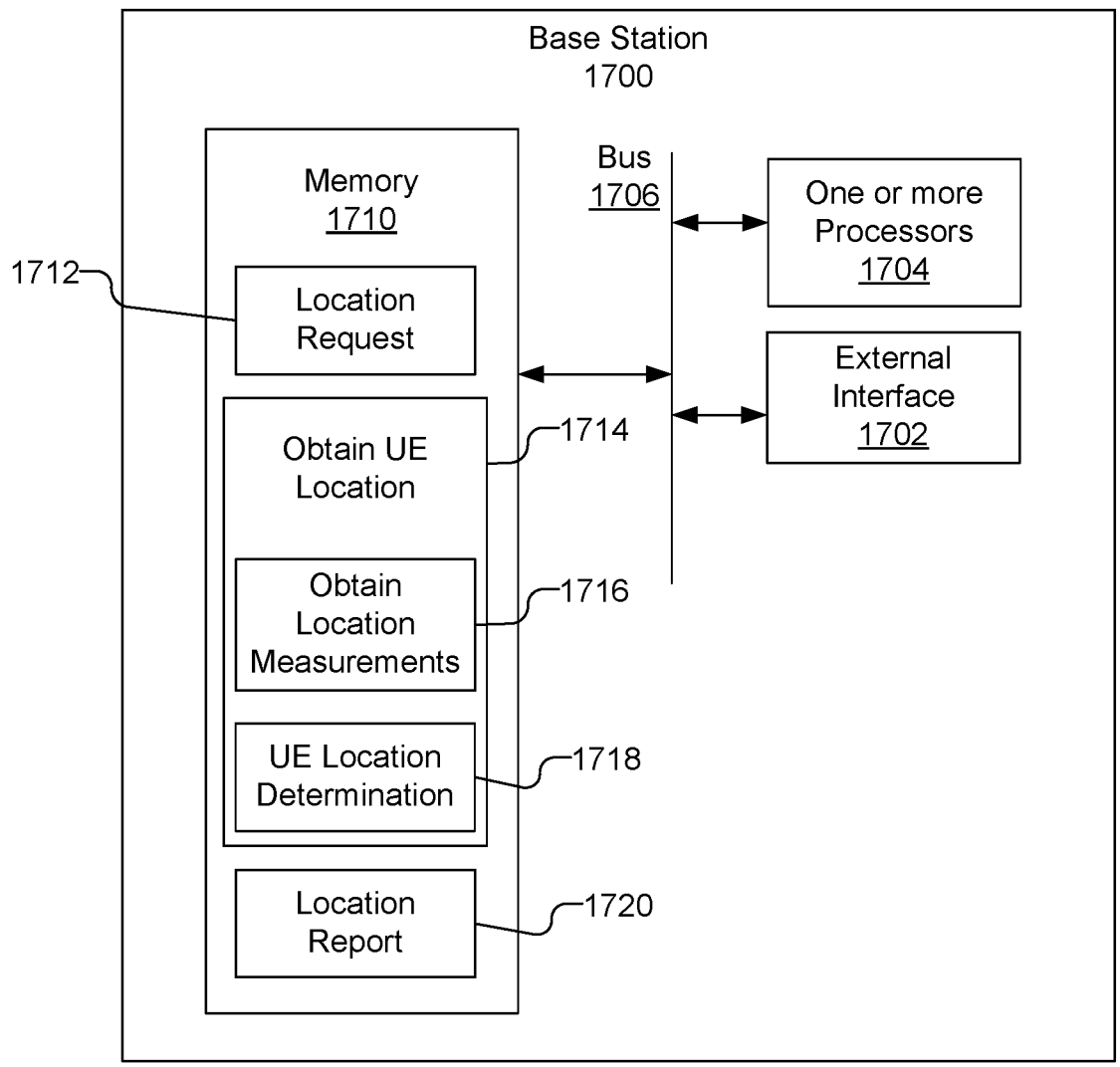
FIG. 17 is a diagram illustrating an example of a hardware implementation of an base station capable of supporting location services for a UE.

FIG. 17 is a diagram illustrating an example of a hardware implementation of a base station 1700, such as gNB 110-1 or ng-eNB 114 shown in FIGS. 1-2. The base station 1700 may be, e.g., part of a RAN such as NG-RAN 112. The base station 1700 includes, e.g., hardware components such as an external interface 1702, which may be a wired or wireless interface capable of connecting to a UE, such as UE 105, other base stations with the RAN, such as gNB 110-2, 110-3, and ng-eNB 114 in NG-RAN 112, and an AMF, such as AMF 154. The base station 1700 includes one or more processors 1704 and memory 1710, which may be coupled together with bus 1706. The memory 1710 may contain executable code or software instructions that when executed by the one or more processors 1704 cause the one or more processors 1704 to operate as a special purpose computer programmed to perform the procedures and techniques disclosed herein (e.g. such as the process flow 1600).

As illustrated in FIG. 17, the memory 1710 includes one or more components or modules that when implemented by the one or more processors 1704 implements the methodologies described herein. While the components or modules are illustrated as software in memory 1710 that is executable by the one or more processors 1704, it should be understood that the components or modules may be dedicated hardware or firmware either in the processors 1704 or off processor. As illustrated, the memory 1710 may include a location request unit 1712 that enables the one or more processors 1704 to receive via the external interface 1702 and process a location service request transmitted by an AMF. The location request may include a type of location request, a required location accuracy, a required location response time or some combination thereof. The type of location request, for example, may be a request for periodic or triggered location of the UE.

The obtain UE location unit 1714 may enable the one or more processors 1704 to obtain the location of the UE. For example, the base station may obtain the UE based on the current or previous serving cell or a tracking area (TA) for the UE. In other implementations, the obtain UE location unit 1714 may include an obtain location measurements unit 1716 that may enable the one or more processors 1704 to obtain, via the external interface 1702, location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof. The obtain UE location unit 1714 may further include a UE location determination unit 1718 that enables the one or more processors 1704 to determine the UE location from the obtained location measurements using at least one of Observed Time Difference Of Arrival (OT-DOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

A location report unit 1720 may enable the one or more processors 1704 to send via the external interface 1702, the UE location to the serving AMF. For example, a Next Generation Application Protocol (NGAP) may be used to provide the UE location to the serving RAN.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1710) and executed by one or more processor units (e.g. processors 1704), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1710, and are configured to cause the one or more processors (e.g. processors 1704) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station (e.g. an base station 1700) capable of supporting location services for a user equipment (UE) may include a means for receiving from a serving Access and Mobility Management Function (AMF) for the UE a location request for the UE, where the serving AMF receives the location request from a Network Exposure Function (NEF), where the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, where the NEF determines either a Gateway Mobile Location Center (GMLC) or the serving AMF for the UE to obtain a UE location, where the GMLC employs a location server to obtain the UE location, where the serving AMF obtains the UE location based on the serving RAN for the UE, where the NEF determines the serving AMF based on at least one of the type of location request, the required location accuracy, the required location response time and whether the PLMN supports location of UEs using a GMLC or a serving AMF, which may be, e.g., the external interface 1702 and one or more processors 1704 with dedicated hardware or implementing executable code or software instructions in memory 1710 such as the location request unit 1712. A means for obtaining the UE location may be, e.g., the external interface 1702 and one or more processors 1704 with dedicated hardware or implementing executable code or software instructions in memory 1710 such as the obtain UE location unit 1714, the obtain location measurements unit 1716, and the UE location determination unit 1718. A means for sending the UE location to the serving AMF may be, e.g., the external interface 1702 and one or more processors 1704 with dedicated hardware or implementing executable code or software instructions in memory 1710 such as the location report unit 1720.

The base station may further include, e.g., for when the type of location request is a request for periodic or triggered locations of the UE, a means for sending a plurality of additional location reports to the serving AMF, each location report in the plurality of additional location reports comprising an indication of a trigger event, a location for the UE or both, which may be, e.g., the external interface 1702 and one or more processors 1704 with dedicated hardware or implementing executable code or software instructions in memory 1710 such as the location report unit 1720.

One implementation (1) may be a method for supporting location services for a user equipment (UE) performed by a Gateway Mobile Location Center (GMLC), the method comprising: receiving from a Network Exposure Function (NEF) a location request for the UE, wherein the NEF received the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either the GMLC or a serving Access and Mobility Management Function (AMF) for the UE to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; sending the location request to the location server; receiving the UE location or a confirmation of the location request from the location server; and sending the UE location or the confirmation of the location request to the NEF.

There may be some implementations (2) of the above described method (1), wherein the other entity is an external client, an Application Function (AF) outside the PLMN or a Network Function (NF) inside the PLMN.

There may be some implementations (3) of the above described method (1), wherein the location server is a Location Management Function (LMF), wherein the GMLC sends the location request to the LMF directly or via a serving AMF for the UE, wherein the LMF obtains the UE location by obtaining location measurements or a location estimate from at least one of the UE and a serving RAN for the UE.

There may be some implementations (4) of the above described method (3), wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

There may be some implementations (5) of the above described method (1), wherein the type of location request comprises a request for periodic or triggered location of the UE and further comprising: receiving a plurality of additional location reports from the location server, each location report in the plurality of additional location reports comprising an indication of a trigger event, a location for the UE or both; and sending, for each location report, the trigger event, the location or both to the NEF.

One implementation (6) may be a Gateway Mobile Location Center (GMLC) for supporting location services for a user equipment (UE) comprising: an external interface for receiving and sending messages to entities in a network; memory configured to store instructions; and at least one processor coupled to the external interface and the memory, the at least one processor configured by the instructions stored in memory to: receive via the external interface from a Network Exposure Function (NEF) a location request for the UE, wherein the NEF received the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determined either the GMLC or a serving Access and Mobility Management Function (AMF) to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; send via the external interface the location request to the location server; receive via the external interface the UE location or a confirmation of the location request from the location server; and send via the external interface the UE location or the confirmation of the location request to the NEF.

There may be some implementations (7) of the above described GMLC (6), wherein the other entity is an external client, an Application Function (AF) outside the PLMN or a Network Function (NF) inside the PLMN.

There may be some implementations (8) of the above described GMLC (6), wherein the location server is a Location Management Function (LMF), wherein the GMLC sends the location request to the LMF directly or via a serving AMF for the UE, wherein the LMF obtains the UE location by obtaining location measurements or a location estimate from at least one of the UE and a serving RAN for the UE.

There may be some implementations (9) of the above described GMLC (8), wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

There may be some implementations (10) of the above described GMLC (6), wherein the type of location request comprises a request for periodic or triggered locations of the UE and the at least one processor is further configured to: receive via the external interface a plurality of additional location reports from the location server, each location report in the plurality of location reports comprising an indication of a trigger event, a location for the UE or both; and send via the external interface, for each location report, the trigger event, the location or both to the NEF.

One implementation (11) may be a Gateway Mobile Location Center (GMLC) for supporting location services for a user equipment (UE), comprising: means for receiving from a Network Exposure Function (NEF) a location request for the UE, wherein the NEF receives the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either the GMLC or a serving Access and Mobility Management Function (AMF) for the UE to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; means for sending the location request to the location server; means for receiving the UE location or a confirmation of the location request from the location server; and means for sending the UE location or the confirmation of the location request to the NEF.

There may be some implementations (12) of the above described GMLC (11), wherein the other entity is an external client, an Application Function (AF) outside the PLMN or a Network Function (NF) inside the PLMN.

There may be some implementations (13) of the above described GMLC (11), wherein the location server is a Location Management Function (LMF), wherein the GMLC sends the location request to the LMF directly or via a serving AMF for the UE, wherein the LMF obtains the UE location by obtaining location measurements or a location estimate from at least one of the UE and a serving RAN for the UE.

There may be some implementations (14) of the above described GMLC (13), wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

There may be some implementations (15) of the above described GMLC (11), wherein the type of location request comprises a request for periodic or triggered location of the UE and further comprising: means for receiving a plurality of additional location reports from the location server, each location report in the plurality of additional location reports comprising an indication of a trigger event, a location for the UE or both; and means for sending, for each location report, the trigger event, the location or both to the NEF.

One implementation (16) may be a non-transitory computer readable medium comprising instructions, which when executed by a processor of a Gateway Mobile Location Center (GMLC) for supporting location services for a user equipment (UE) cause the processor to: receive from a Network Exposure Function (NEF) a location request for the UE, wherein the NEF receives the location request from an other entity and the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either the GMLC or a serving Access and Mobility Management Function (AMF) for the UE to obtain a UE location, wherein the GMLC employs a location server to obtain the UE location, wherein the serving AMF obtains the UE location based on a serving Radio Access Network (RAN) for the UE, wherein the NEF determines the GMLC based on at least one of the type of location request, the required location accuracy, the required location response time and whether the PLMN supports location of UEs using a GMLC or a serving AMF; send the location request to the location server; receive the UE location or a confirmation of the location request from the location server; and send the UE location or the confirmation of the location request to the NEF.

There may be some implementations (17) of the above described non-transitory computer readable medium (16), wherein the other entity is an external client, an Application Function (AF) outside the PLMN or a Network Function (NF) inside the PLMN.

There may be some implementations (18) of the above described non-transitory computer readable medium (16), wherein the location server is a Location Management Function (LMF), wherein the GMLC sends the location request to the LMF directly or via a serving AMF for the UE, wherein the LMF obtains the UE location by obtaining location measurements or a location estimate from at least one of the UE and a serving RAN for the UE.

There may be some implementations (19) of the above described non-transitory computer readable medium (17), wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

There may be some implementations (20) of the above described non-transitory computer readable medium (16), wherein the type of location request comprises a request for periodic or triggered location of the UE and further comprising instructions that when implemented by the processor cause the processor to: receive a plurality of additional location reports from the location server, each location report in the plurality of additional location reports comprising an indication of a trigger event, a location for the UE or both; and send, for each location report, the trigger event, the location or both to the NEF.

One implementation (21) may be a method for supporting location services for a user equipment (UE) performed by a serving Access and Mobility Management Function (AMF) for the UE, the method comprising: receiving from a Network Exposure Function (NEF) a location request for the UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; sending the location request to the serving RAN for the UE; receiving the UE location or a confirmation of the location request from the serving RAN; and sending the UE location or the confirmation of the location request to the NEF.

There may be some implementations (22) of the above described method (21), wherein the other entity is an external client, an Application Function (AF) outside the PLMN or a Network Function (NF) inside the PLMN.

There may be some implementations (23) of the above described method (21), wherein the serving RAN obtains the UE location based on a current or previous serving cell or a tracking area (TA) for the UE.

There may be some implementations (24) of the above described method (21), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (25) of the above described method (24), wherein the serving base station is a New Radio (NR) Node B (gNB) or a Next Generation (NG) evolved NodeB (ng-eNB).

There may be some implementations (26) of the above described method (21), wherein the serving AMF uses a Next Generation Application Protocol (NGAP) to obtain the UE location from the serving RAN.

There may be some implementations (27) of the above described method (24), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (28) of the above described method (21), wherein receiving the location request from the NEF comprises receiving an AMF Event Exposure Subscribe service operation invoked by the NEF towards the serving AMF to request information on the location of the UE.

There may be some implementations (29) of the above described method (28), wherein either the serving AMF address is obtained by the NEF querying a Unified Data Management (UDM) in the HPLMN for the UE or the AMF Event Exposure Subscribe service operation invoked by the NEF towards the serving AMF is received via the UDM for the UE.

There may be some implementations (30) of the above described method (21), wherein the type of location request comprises a request for periodic or triggered location of the UE and further comprising: receiving a plurality of additional location reports from the serving RAN, each location report in the plurality of additional location reports comprising an indication of a trigger event, a location for the UE or both; and sending, for each location report, the trigger event, the location or both to the NEF.

One implementation (31) may be a serving Access and Mobility Management Function (AMF) for a user equipment (UE) for supporting location services for the UE, the serving AMF comprising: an external interface for receiving and sending messages to entities in a network; memory configured to store instructions; and at least one processor coupled to the external interface and the memory, the at least one processor configured by the instructions stored in memory to: receive via the external interface from a Network Exposure Function (NEF) a location request for a UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; send via the external interface the location request to the serving RAN for the UE; receive via the external interface the UE location or a confirmation of the location request from the serving RAN; and send via the external interface the UE location or the confirmation of the location request to the NEF.

There may be some implementations (32) of the above described serving AMF (31), wherein the other entity is an external client, an Application Function (AF) outside the PLMN or a Network Function (NF) inside the PLMN.

There may be some implementations (33) of the above described serving AMF (31), wherein the serving RAN obtains the UE location based on a current or previous serving cell or a tracking area (TA) for the UE.

There may be some implementations (34) of the above described serving AMF (31), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (35) of the above described serving AMF (34), wherein the serving base station is a New Radio (NR) Node B (gNB) or a Next Generation (NG) evolved NodeB (ng-eNB).

There may be some implementations (36) of the above described serving AMF (31), wherein the serving AMF uses a Next Generation Application Protocol (NGAP) to obtain the UE location from the serving RAN.

There may be some implementations (37) of the above described serving AMF (34), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (38) of the above described serving AMF (31), wherein the at least one processor is configured to receive the location request from the NEF by being configured to receive an AMF Event Exposure Subscribe service operation invoked by the NEF towards the serving AMF to request information on the location of the UE.

There may be some implementations (39) of the above described serving AMF (38), wherein either the serving AMF address is obtained by the NEF querying a Unified Data Management (UDM) in the HPLMN for the UE or the AMF Event Exposure Subscribe service operation invoked by the NEF towards the serving AMF is received via the UDM for the UE.

There may be some implementations (40) of the above described serving AMF (31), wherein the type of location request comprises a request for periodic or triggered locations of the UE and the at least one processor is further configured to: receive via the external interface a plurality of additional location reports from the serving RAN, each location report in the plurality of additional location reports comprising an indication of a trigger event, a location for the UE or both; and send via the external interface, for each location report, the trigger event, the location or both to the NEF.

One implementation (41) may be a serving Access and Mobility Management Function (AMF) for a user equipment (UE) for supporting location services for the UE, comprising: means for receiving from a Network Exposure Function (NEF) a location request for the UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; means for sending the location request to the serving RAN for the UE; means for receiving the UE location or a confirmation of the location request from the serving RAN; and means for sending the UE location or the confirmation of the location request to the NEF.

There may be some implementations (42) of the above described serving AMF (41), wherein the other entity is an external client, an Application Function (AF) outside the PLMN or a Network Function (NF) inside the PLMN.

There may be some implementations (43) of the above described serving AMF (41), wherein the serving RAN obtains the UE location based on a current or previous serving cell or a tracking area (TA) for the UE.

There may be some implementations (44) of the above described serving AMF (41), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (45) of the above described serving AMF (44), wherein the serving base station is a New Radio (NR) Node B (gNB) or a Next Generation (NG) evolved NodeB (ng-eNB).

There may be some implementations (46) of the above described serving AMF (41), wherein the serving AMF uses a Next Generation Application Protocol (NGAP) to obtain the UE location from the serving RAN.

There may be some implementations (47) of the above described serving AMF (44), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (48) of the above described serving AMF (41), wherein the means for receiving the location request from the NEF comprises means for receiving an AMF Event Exposure Subscribe service operation invoked by the NEF towards the serving AMF to request information on the location of the UE.

There may be some implementations (49) of the above described serving AMF (48), wherein either the serving AMF address is obtained by the NEF querying a Unified Data Management (UDM) in the HPLMN for the UE or the AMF Event Exposure Subscribe service operation invoked by the NEF towards the serving AMF is received via the UDM for the UE.

There may be some implementations (50) of the above described serving AMF (41), wherein the type of location request comprises a request for periodic or triggered location of the UE and further comprising: means for receiving a plurality of additional location reports from the serving RAN, each location report in the plurality of additional location reports comprising an indication of a trigger event, a location for the UE or both; and means for sending, for each location report, the trigger event, the location or both to the NEF.

One implementation (51) may be a non-transitory computer readable medium comprising instructions, which when executed by a processor of a serving Access and Mobility Management Function (AMF) for supporting location services for a user equipment (UE), cause the processor to: receive from a Network Exposure Function (NEF) a location request for the UE, wherein the NEF receives the location request from an other entity and wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on a serving Radio Access Network (RAN) for the UE, wherein the NEF determines the serving AMF based on at least one of the type of location request, the required location accuracy, the required location response time and whether the PLMN supports location of UEs using a GMLC or a serving AMF; send the location request to the serving RAN for the UE; receive the UE location or a confirmation of the location request from the serving RAN; and send the UE location or the confirmation of the location request to the NEF.

There may be some implementations (52) of the above described non-transitory computer readable medium (51), wherein the other entity is an external client, an Application Function (AF) outside the PLMN or a Network Function (NF) inside the PLMN.

There may be some implementations (53) of the above described non-transitory computer readable medium (51), wherein the serving RAN obtains the UE location based on a current or previous serving cell or a tracking area (TA) for the UE.

There may be some implementations (54) of the above described non-transitory computer readable medium (51), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (55) of the above described non-transitory computer readable medium (54), wherein the serving base station is a New Radio (NR) Node B (gNB) or a Next Generation (NG) evolved NodeB (ng-eNB).

There may be some implementations (56) of the above described non-transitory computer readable medium (51), wherein the serving AMF uses a Next Generation Application Protocol (NGAP) to obtain the UE location from the serving RAN.

There may be some implementations (57) of the above described non-transitory computer readable medium (54), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (58) of the above described non-transitory computer readable medium (51), wherein the instructions to receive the location request from the NEF comprises instructions that when implemented by the processor cause the processor to receive an AMF Event Exposure Subscribe service operation invoked by the NEF towards the serving AMF to request information on the location of the UE.

There may be some implementations (59) of the above described non-transitory computer readable medium (58), wherein either the serving AMF address is obtained by the NEF querying a Unified Data Management (UDM) in the HPLMN for the UE or the AMF Event Exposure Subscribe service operation invoked by the NEF towards the serving AMF is received via the UDM for the UE.

There may be some implementations (60) of the above described non-transitory computer readable medium (51), wherein the type of location request comprises a request for periodic or triggered location of the UE and further comprising: instructions that when implemented by the processor cause the processor to receive a plurality of additional location reports from the serving RAN, each location report in the plurality of additional location reports comprising an indication of a trigger event, a location for the UE or both; and send, for each location report, the trigger event, the location or both to the NEF.

One implementation (61) may be a method for supporting location services for a user equipment (UE) performed by a serving base station for the UE, the serving base station being in a serving Radio Access Network (RAN) for the UE, the method comprising: receiving from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; obtaining the UE location; and sending the UE location to the serving AMF.

There may be some implementations (62) of the above described method (61), wherein the other entity is an external client, an Application Function (AF) outside the PLMN or a Network Function (NF) inside the PLMN.

There may be some implementations (63) of the above described method (61), wherein the serving base station in the serving RAN obtains the UE location based on a current or previous serving cell or a tracking area (TA) for the UE.

There may be some implementations (64) of the above described method (61), wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (65) of the above described method (64), wherein the serving base station is a New Radio (NR) Node B (gNB) or a Next Generation (NG) evolved NodeB (ng-eNB).

There may be some implementations (66) of the above described method (61), wherein the serving base station uses a Next Generation Application Protocol (NGAP) to provide the UE location to the serving AMF.

There may be some implementations (67) of the above described method (64), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (68) of the above described method (61), wherein the type of location request comprises a request for periodic or triggered location of the UE and further comprising: sending a plurality of additional location reports to the serving AMF, each location report in the plurality of additional location reports comprising an indication of a trigger event, a location for the UE or both.

One implementation (69) may be a serving base station for user equipment (UE), the serving base station being in a serving Radio Access Network (RAN) for the UE for supporting location services for the UE, the serving base station comprising: an external interface for receiving and sending messages to entities in a network; memory configured to store instructions; and at least one processor coupled to the external interface and the memory, the at least one processor configured by the instructions stored in memory to: receive via the external interface from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; obtain the UE location; and send via the external interface the UE location to the serving AMF.

There may be some implementations (70) of the above described serving base station (69), wherein the other entity is an external client, an Application Function (AF) outside the PLMN or a Network Function (NF) inside the PLMN.

There may be some implementations (71) of the above described serving base station (69), wherein the at least one processor is configured to obtain the UE location based on a current or previous serving cell or a tracking area (TA) for the UE.

There may be some implementations (72) of the above described serving base station (69), wherein the at least one processor is configured to obtain the UE location by being configured to obtain location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (73) of the above described serving base station (72), wherein the serving base station is a New Radio (NR) Node B (gNB) or a Next Generation (NG) evolved NodeB (ng-eNB).

There may be some implementations (74) of the above described serving base station (69), wherein the at least one processor is configured to use a Next Generation Application Protocol (NGAP) to provide the UE location to the serving AMF.

There may be some implementations (75) of the above described serving base station (62), wherein the at least one processor is configured to determine the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (76) of the above described serving base station (69), wherein the type of location request comprises a request for periodic or triggered locations of the UE and the at least one processor is further configured to: send via the external interface a plurality of additional location reports to the serving AMF, each location report in the plurality of additional location reports comprising an indication of a trigger event, a location for the UE or both.

One implementation (77) may be a serving base station for user equipment (UE), the serving base station being in a serving Radio Access Network (RAN) for the UE for supporting location services for the UE, the serving base station comprising: means for receiving from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; means for obtaining the UE location; and means for sending the UE location to the serving AMF.

There may be some implementations (78) of the above described serving base station (77), wherein the other entity is an external client, an Application Function (AF) outside the PLMN or a Network Function (NF) inside the PLMN.

There may be some implementations (79) of the above described serving base station (77), wherein the serving base station in the serving RAN obtains the UE location based on a current or previous serving cell or a tracking area (TA) for the UE.

There may be some implementations (80) of the above described serving base station (77), wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (81) of the above described serving base station (80), wherein the serving base station is a New Radio (NR) Node B (gNB) or a Next Generation (NG) evolved NodeB (ng-eNB).

There may be some implementations (82) of the above described serving base station (77), wherein the serving base station uses a Next Generation Application Protocol (NGAP) to provide the UE location to the serving AMF.

There may be some implementations (83) of the above described serving base station (80), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (84) of the above described serving base station (77), wherein the type of location request comprises a request for periodic or triggered location of the UE and further comprising: means for sending a plurality of additional location reports to the serving AMF, each location report in the plurality of additional location reports comprising an indication of a trigger event, a location for the UE or both.

One implementation (85) may be a non-transitory computer readable medium comprising instructions, which when executed by a processor of a serving base station for user equipment (UE), the serving base station being in a serving Radio Access Network (RAN) for the UE for supporting location services for the UE, cause the processor to: receive from a serving Access and Mobility Management Function (AMF) for the UE a location request for the UE, wherein the serving AMF receives the location request from a Network Exposure Function (NEF), wherein the NEF receives the location request from an other entity and the NEF is in a Public Land Mobile Network (PLMN) that is a Home PLMN (HPLMN) for the UE or a Visited PLMN (VPLMN) for the UE, the location request received by the NEF including a type of location request, a required location accuracy, a required location response time or some combination of these, wherein the NEF determines either a Gateway Mobile Location Center (GMLC) or the serving AMF for the UE to obtain a UE location, wherein the GMLC employs a location server to obtain the UE location, wherein the serving AMF obtains the UE location based on the serving RAN for the UE, wherein the NEF determines the serving AMF based on at least one of the type of location request, the required location accuracy, the required location response time and whether the PLMN supports location of UEs using a GMLC or a serving AMF; obtain the UE location; and send the UE location to the serving AMF.

There may be some implementations (86) of the above described non-transitory computer readable medium (85), wherein the other entity is an external client, an Application Function (AF) outside the PLMN or a Network Function (NF) inside the PLMN.

There may be some implementations (87) of the above described non-transitory computer readable medium (85), wherein the serving base station in the serving RAN obtains the UE location based on a current or previous serving cell or a tracking area (TA) for the UE.

There may be some implementations (88) of the above described non-transitory computer readable medium (85), wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

There may be some implementations (89) of the above described non-transitory computer readable medium (88), wherein the serving base station is a New Radio (NR) Node B (gNB) or a Next Generation (NG) evolved NodeB (ng-eNB).

There may be some implementations (90) of the above described non-transitory computer readable medium (85), wherein the serving base station uses a Next Generation Application Protocol (NGAP) to provide the UE location to the serving AMF.

There may be some implementations (91) of the above described non-transitory computer readable medium (88), wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

There may be some implementations (92) of the above described non-transitory computer readable medium (85), wherein the type of location request comprises a request for periodic or triggered location of the UE and further comprising instructions that when implemented by the processor cause the processor to send a plurality of additional location reports to the serving AMF, each location report in the plurality of additional location reports comprising an indication of a trigger event, a location for the UE or both.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) performed by a Network Exposure Function (NEF), the method comprising:
   receiving by the NEF a location request for the UE from a second entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these;
   selecting, by the NEF, between a Gateway Mobile Location Center (GMLC) and a serving Access and Mobility Management Function (AMF) to obtain a UE location, wherein the selection of the GMLC or the serving AMF is based on: the type of location request, the required location accuracy, or the required location response time or a combination thereof;
   sending, by the NEF, the location request to the selected GMLC or the selected serving AMF;
   receiving, by the NEF, the UE location or a confirmation of acceptance of the location request from the selected GMLC or the selected serving AMF; and
   sending, by the NEF, the UE location or the confirmation of the acceptance of the location request to the second entity.

2. The method of claim 1, wherein the second entity is an external client, an Application Function (AF) outside the PLMN or a Network Function (NF) inside the PLMN.

3. The method of claim 1, wherein the GMLC employs a location server to obtain the UE location, wherein the location server is a Location Management Function (LMF), wherein the selected GMLC forwards the location request to the LMF directly or via the serving AMF for the UE, wherein the LMF obtains the UE location by obtaining location measurements or a location estimate from at least one of the UE and a serving Radio Access Network (RAN) for the UE.

4. The method of claim 3, wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

5. The method of claim 1, wherein the GMLC employs a location server to obtain the UE location, wherein the location server is a Secure User Plane Location (SUPL) Location Platform (SLP), wherein the GMLC comprises the location server, wherein the location server obtains the UE location by obtaining location measurements or a location estimate from the UE using a SUPL User Plane Location Protocol (ULP).

6. The method of claim 1, wherein the serving AMF obtains the UE location from a serving Radio Access Network (RAN), wherein the serving RAN obtains the UE location based on a current or previous serving cell or a tracking area (TA) for the UE.

7. The method of claim 1, wherein the serving AMF obtains the UE location from a serving Radio Access Network (RAN), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

8. The method of claim 7, wherein the serving base station is a New Radio (NR) Node B (gNB) or a Next Generation (NG) evolved NodeB (ng-eNB).

9. The method of claim 7, wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

10. The method of claim 1, wherein the serving AMF uses a Next Generation Application Protocol (NGAP) to obtain the UE location from a serving Radio Access Network (RAN).

11. The method of claim 1, wherein sending the location request to the serving AMF comprises invoking an AMF Event Exposure Subscribe service operation towards the serving AMF to request information on the location of the UE.

12. The method of claim 11, wherein the serving AMF is selected, and further comprising either querying a Unified Data Management (UDM) in the HPLMN for the UE for a serving AMF address or sending the AMF Event Exposure Subscribe service operation towards the serving AMF via the UDM for the UE.

13. The method of claim 1, wherein the type of location request comprises a request for periodic or triggered locations of the UE and further comprising:
   receiving a plurality of additional location reports from the selected GMLC or selected serving AMF, each location report in the plurality of additional location reports comprising an indication of a trigger event, a location for the UE or both; and
   sending, for each location report, the trigger event, the location or both to the second entity.

14. A Network Exposure Function (NEF) for supporting location services for a user equipment (UE) comprising:
   an external interface for receiving and sending messages to entities in a network;
   at least one memory and
   one or more processors coupled to the external interface and the at least one memory, the one or more processors configured to:
   receive via the external interface a location request for the UE from a second entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these;
   select between a Gateway Mobile Location Center (GMLC) and a serving Access and Mobility Management Function (AMF) to obtain a UE location, wherein the selection of the GMLC or the serving AMF is based on: the type of location request, the required location accuracy, or the required location response time or a combination thereof;

send via the external interface the location request to the selected GMLC or the selected serving AMF;

receive via the external interface the UE location or a confirmation of acceptance of the location request from the selected GMLC or the selected serving AMF; and send via the external interface the UE location or the confirmation of the acceptance of the location request to the second entity.

15. The NEF of claim 14, wherein the second entity is an external client, an Application Function (AF) outside the PLMN or a Network Function (NF) inside the PLMN.

16. The NEF of claim 14, wherein the GMLC employs a location server to obtain the UE location, wherein the location server is a Location Management Function (LMF), wherein the selected GMLC forwards the location request to the LMF directly or via the serving AMF for the UE, wherein the LMF obtains the UE location by obtaining location measurements or a location estimate from at least one of the UE and a serving Radio Access Network (RAN) for the UE.

17. The NEF of claim 16, wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

18. The NEF of claim 14, wherein the GMLC employs a location server to obtain the UE location, wherein the location server is a Secure User Plane Location (SUPL) Location Platform (SLP), wherein the GMLC comprises the location server, wherein the location server obtains the UE location by obtaining location measurements or a location estimate from the UE using a SUPL User Plane Location Protocol (ULP).

19. The NEF of claim 14, wherein the serving AMF obtains the UE location from a serving Radio Access Network (RAN), wherein the serving RAN obtains the UE location based on a current or previous serving cell or a tracking area (TA) for the UE.

20. The NEF of claim 14, wherein the serving AMF obtains the UE location from a serving Radio Access Network (RAN), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

21. The NEF of claim 20, wherein the serving base station is a New Radio (NR) Node B (gNB) or a Next Generation (NG) evolved NodeB (ng-eNB).

22. The NEF of claim 20, wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

23. The NEF of claim 14, wherein the serving AMF uses a Next Generation Application Protocol (NGAP) to obtain the UE location from a serving Radio Access Network (RAN).

24. The NEF of claim 14, wherein the one or more processors may be configured to send the location request to the serving AMF by being configured to invoke an AMF Event Exposure Subscribe service operation towards the serving AMF to request information on the location of the UE.

25. The NEF of claim 24, wherein the serving AMF is selected, and wherein the one or more processors may be further configured to either query a Unified Data Management (UDM) in the HPLMN for the UE for a serving AMF address or send the AMF Event Exposure Subscribe service operation towards the serving AMF via the UDM for the UE.

26. The NEF of claim 14, wherein the type of location request comprises a request for periodic or triggered locations of the UE and wherein the at least on processor is further configured to:

receive via the external interface a plurality of additional location reports from the selected GMLC or selected serving AMF, each location report in the plurality of additional location reports comprising an indication of a trigger event, a location for the UE or both; and send via the external interface for each location report, the trigger event, the location or both to the second entity.

27. A Network Exposure Function (NEF) for supporting location services for a user equipment (UE) comprising:

means for receiving by the NEF a location request for the UE from a second entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these;

means for selecting, by the NEF, between a Gateway Mobile Location Center (GMLC) and a serving Access and Mobility Management Function (AMF) to obtain a UE location, wherein the selecting of the GMLC or the serving AMF is based on: the type of location request, the required location accuracy, or the required location response time or a combination thereof;

means for sending, by the NEF, the location request to the selected GMLC or the selected serving AMF;

means for receiving, by the NEF, the UE location or a confirmation of acceptance of the location request from the selected GMLC or the selected serving AMF; and means for sending, by the NEF, the UE location or the confirmation of the acceptance of the location request to the second entity.

28. The NEF of claim 27, wherein the second entity is an external client, an Application Function (AF) outside the PLMN or a Network Function (NF) inside the PLMN.

29. The NEF of claim 27, wherein the GMLC employs a location server to obtain the UE location, wherein the location server is a Location Management Function (LMF), wherein the selected GMLC forwards the location request to the LMF directly or via the serving AMF for the UE, wherein the LMF obtains the UE location by obtaining location measurements or a location estimate from at least one of the UE and a serving Radio Access Network (RAN) for the UE.

30. The NEF of claim 29, wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

31. The NEF of claim 27, wherein the GMLC employs a location server to obtain the UE location, wherein the location server is a Secure User Plane Location (SUPL) Location Platform (SLP), wherein the GMLC comprises the location server, wherein the location server obtains the UE location by obtaining location measurements or a location estimate from the UE using a SUPL User Plane Location Protocol (ULP).

32. The NEF of claim 27, wherein the serving AMF obtains the UE location from a serving Radio Access Network (RAN), wherein the serving RAN obtains the UE location based on a current or previous serving cell or a tracking area (TA) for the UE.

33. The NEF of claim 27, wherein the serving AMF obtains the UE location from a serving Radio Access Network (RAN), wherein the serving RAN obtains the UE location based on a serving base station for the UE in the serving RAN, wherein the serving base station obtains the UE location by obtaining location measurements comprising: measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

34. The NEF of claim 33, wherein the serving base station is a New Radio (NR) Node B (gNB) or a Next Generation (NG) evolved NodeB (ng-eNB).

35. The NEF of claim 33, wherein the serving base station determines the UE location from the obtained location measurements using at least one of Observed Time Difference Of Arrival (OTDOA), round trip signal propagation time (RTT), angle of departure (AOD), angle of arrival (AOA), enhanced cell ID (ECID), Assisted Global Navigation Satellite System (A-GNSS) and Real Time Kinematic (RTK).

36. The NEF of claim 27, wherein the serving AMF uses a Next Generation Application Protocol (NGAP) to obtain the UE location from a serving Radio Access Network (RAN).

37. The NEF of claim 27, wherein the means for sending the location request to the serving AMF invokes an AMF Event Exposure Subscribe service operation towards the serving AMF to request information on the location of the UE.

38. The NEF of claim 37, wherein the serving AMF is selected, and further comprising either means for querying a Unified Data Management (UDM) in the HPLMN for the UE for a serving AMF address or means for sending the AMF Event Exposure Subscribe service operation towards the serving AMF via the UDM for the UE.

39. The NEF of claim 27, wherein the type of location request comprises a request for periodic or triggered locations of the UE and further comprising:
means for receiving a plurality of additional location reports from the selected GMLC or selected serving AMF, each location report in the plurality of additional location reports comprising an indication of a trigger event, a location for the UE or both; and means for sending for each location report the trigger event, the location or both to the second entity.

40. A non-transitory computer readable medium comprising instructions, which when executed by a processor of a Network Exposure Function (NEF) for supporting location services for a user equipment (UE) cause the processor to:
receive by the NEF a location request for the UE from a second entity, wherein the NEF is in a Public Land Mobile Network (PLMN) that is a Home PLMN (HPLMN) for the UE or a Visited PLMN (VPLMN) for the UE, the location request including a type of location request, a required location accuracy, a required location response time or some combination of these;
select, by the NEF, between a Gateway Mobile Location Center (GMLC) and a serving Access and Mobility Management Function (AMF) to obtain a UE location, wherein the selection of the GMLC or the serving AMF is based on: the type of location request, the required location accuracy, or the required location response time or a combination thereof;
send, by the NEF, the location request to the selected GMLC or the selected serving AMF;
receive, by the NEF, the UE location or a confirmation of acceptance of the location request from the selected GMLC or selected serving AMF; and
send, by the NEF, the UE location or the confirmation of the acceptance of the location request to the second entity.

41. The non-transitory computer readable medium of claim 40, wherein the second entity is an external client, an Application Function (AF) outside the PLMN or a Network Function (NF) inside the PLMN.

42. The non-transitory computer readable medium of claim 40, wherein the GMLC employs a location server to obtain the UE location, wherein the location server is a Location Management Function (LMF), wherein the selected GMLC forwards the location request to the LMF directly or via the serving AMF for the UE, wherein the LMF obtains the UE location by obtaining location measurements or a location estimate from at least one of the UE and a serving Radio Access Network (RAN) for the UE.

43. The non-transitory computer readable medium of claim 42, wherein the LMF obtains the location measurements or the location estimate from the UE using at least one of a Long Term Evolution (LTE) Positioning Protocol (LPP) or a New Radio Positioning Protocol (NPP), wherein the LMF obtains the location measurements or the location estimate from the serving RAN using a New Radio (NR) Positioning Protocol A (NRPPa).

44. The non-transitory computer readable medium of claim 40, wherein the GMLC employs a location server to obtain the UE location, wherein the location server is a Secure User Plane Location (SUPL) Location Platform (SLP), wherein the GMLC comprises the location server, wherein the location server obtains the UE location by obtaining location measurements or a location estimate from the UE using a SUPL User Plane Location Protocol (ULP).

45. The non-transitory computer readable medium of claim 40, wherein the serving AMF obtains the UE location from a serving Radio Access Network (RAN), wherein the serving RAN obtains the UE location based on a current or previous serving cell or a tracking area (TA) for the UE.

46. The non-transitory computer readable medium of claim 40, wherein the serving AMF obtains the UE location from a serving Radio Access Network (RAN), wherein the serving RAN obtains the UE location based on a serving base station for the UE in the serving RAN, wherein the serving base station obtains the UE location by obtaining location measurements comprising: location measurements of signals transmitted by the UE; location measurements obtained by other base stations in the serving RAN of signals transmitted by the UE; location measurements obtained by the UE of signals transmitted by the serving base station; location measurements obtained by the UE of signals transmitted by other base stations in the serving RAN; or some combination thereof.

47. The non-transitory computer readable medium of claim 46, wherein the serving base station is a New Radio (NR) Node B (gNB) or a Next Generation (NG) evolved NodeB (ng-eNB).

48. The non-transitory computer readable medium of claim 46, wherein the serving base station determines the UE location from the obtained location measurements using at least one of Observed Time Difference Of Arrival (OT-DOA), round trip signal propagation time (RTT), angle of departure (AOD), enhanced cell ID (ECID), angle of arrival (AOA), Assisted Global Navigation Satellite System (A-GNSS) and Real Time Kinematic (RTK).

49. The non-transitory computer readable medium of claim 40, wherein the serving AMF uses a Next Generation Application Protocol (NGAP) to obtain the UE location from a serving Radio Access Network (RAN).

50. The non-transitory computer readable medium of claim 40, wherein the instructions that cause the processor to send the location request to the serving AMF invoke an AMF Event Exposure Subscribe service operation towards the serving AMF to request information on the location of the UE.

51. The non-transitory computer readable medium of claim 50, wherein the serving AMF is selected, and further comprising instructions that cause the processor to either query a Unified Data Management (UDM) in the HPLMN for the UE for a serving AMF address or send the AMF Event Exposure Subscribe service operation towards the serving AMF via the UDM for the UE.

52. The non-transitory computer readable medium of claim 40, wherein the type of location request comprises a request for periodic or triggered locations of the UE and further comprising:
    receiving a plurality of additional location reports from the selected GMLC or selected serving AMF, each location report in the plurality of additional location reports comprising an indication of a trigger event, a location for the UE or both; and
    sending for each location report, the trigger event, the location or both to the second entity.

\* \* \* \* \*